(12) United States Patent
Katsuno et al.

(10) Patent No.: US 10,479,203 B2
(45) Date of Patent: Nov. 19, 2019

(54) VEHICLE EQUIPMENT

(71) Applicant: Clarion Co., Ltd., Saitama-shi, Saitama (JP)

(72) Inventors: Keita Katsuno, Matsudo (JP); Shuji Kasai, Kawasaki (JP)

(73) Assignee: Clarion Co., Ltd., Saitama-shi (JP)

( * ) Notice: Subject to any disclaimer, the term of this patent is extended or adjusted under 35 U.S.C. 154(b) by 536 days.

(21) Appl. No.: 15/128,123

(22) PCT Filed: Feb. 2, 2015

(86) PCT No.: PCT/JP2015/052801
§ 371 (c)(1),
(2) Date: Sep. 22, 2016

(87) PCT Pub. No.: WO2015/146283
PCT Pub. Date: Oct. 1, 2015

(65) Prior Publication Data
US 2017/0096065 A1     Apr. 6, 2017

(30) Foreign Application Priority Data
Mar. 25, 2014   (JP) ................................ 2014-062640

(51) Int. Cl.
*B60K 37/06* (2006.01)
*B60K 35/00* (2006.01)
(Continued)

(52) U.S. Cl.
CPC .............. *B60K 37/06* (2013.01); *B60K 35/00* (2013.01); *B60R 11/0229* (2013.01);
(Continued)

(58) Field of Classification Search
CPC ....................................................... B60K 37/06
See application file for complete search history.

(56) References Cited

U.S. PATENT DOCUMENTS 8,819,581 B2    8/2014  Nakamura et al.
9,716,318 B2 *  7/2017  Shirley ................. H01Q 23/00
(Continued)

FOREIGN PATENT DOCUMENTS

CN          1623821 A       6/2005
CN        101056518 A      10/2007
(Continued)

OTHER PUBLICATIONS

Extended European Search Report issued in counterpart European Patent Application No. 15770399.2 dated Oct. 12, 2017 (Seven (7) pages).

(Continued)

*Primary Examiner* — Alex C Dunn
(74) *Attorney, Agent, or Firm* — Crowell & Moring LLP

(57) ABSTRACT

The object of the invention is to provide a technique for vehicle equipment that can be more easily operated by the user. Vehicle equipment according to the present invention includes a protrusion unit provided near at least one side among four sides forming an outer rim of a rectangular display having a touch panel, the protrusion unit being provided such that a long side of the protrusion unit is substantially in parallel with the one side, wherein a button is provided at at least one of both ends of the protrusion unit in an extending direction of the long side, the button being capable of accepting an input in the extending direction of the long side of the protrusion unit.

4 Claims, 20 Drawing Sheets

(51) Int. Cl.
  *G01C 21/36* (2006.01)
  *B60R 11/02* (2006.01)
  *G06F 3/0362* (2013.01)
  *G06F 3/041* (2006.01)
  *G06F 3/16* (2006.01)

(52) U.S. Cl.
  CPC ....... *G01C 21/3688* (2013.01); *G06F 3/0362* (2013.01); *G06F 3/0416* (2013.01); *G06F 3/167* (2013.01); *B60K 2370/12* (2019.05); *B60K 2370/1438* (2019.05); *B60K 2370/70* (2019.05)

(56) References Cited

U.S. PATENT DOCUMENTS

| | | | | |
|---|---|---|---|---|
| 2004/0142720 | A1* | 7/2004 | Smethers | G06F 3/0482 455/550.1 |
| 2004/0230480 | A1* | 11/2004 | Kanayama | G06Q 20/14 705/13 |
| 2005/0018172 | A1* | 1/2005 | Gelfond | G06F 3/0414 356/51 |
| 2005/0144819 | A1 | 7/2005 | Shimizu et al. | |
| 2006/0135216 | A1 | 6/2006 | Collavo et al. | |
| 2006/0288382 | A1 | 12/2006 | Vitito | |
| 2007/0242010 | A1 | 10/2007 | Tanaka et al. | |
| 2008/0202912 | A1* | 8/2008 | Boddie | H03K 17/962 200/600 |
| 2009/0135089 | A1 | 5/2009 | Konishi et al. | |
| 2011/0015827 | A1* | 1/2011 | Suzuki | G01C 21/26 701/36 |
| 2011/0029185 | A1* | 2/2011 | Aoki | B60K 37/06 701/31.4 |
| 2011/0301836 | A1 | 12/2011 | Hu et al. | |
| 2012/0229376 | A1* | 9/2012 | Matsumoto | G06F 3/016 345/156 |
| 2013/0157607 | A1* | 6/2013 | Paek | H04W 4/90 455/404.1 |
| 2014/0018056 | A1* | 1/2014 | Miyake | H04M 1/6075 455/418 |
| 2015/0212589 | A1* | 7/2015 | Hatanaka | G06F 3/0414 345/173 |
| 2015/0363153 | A1* | 12/2015 | Kato | G06F 3/14 345/629 |

FOREIGN PATENT DOCUMENTS

| | | |
|---|---|---|
| CN | 101309816 A | 11/2008 |
| CN | 101672648 A | 3/2010 |
| JP | 2004-69424 A | 3/2004 |
| JP | 2005-317303 A | 11/2005 |
| JP | 2007-302229 A | 11/2007 |
| KR | 10-1117485 B1 | 3/2012 |
| TW | 534361 U | 5/2003 |

OTHER PUBLICATIONS

Chinese-language Office Action issued in counterpart Chinese Application No. 201580013391.3 dated May 27, 2017 with English translation (Fourteen (14) pages).

International Search Report (PCT/ISA/210) issued in PCT Application No. PCT/JP2015/052801 dated Apr. 7, 2015 with English translation (Two (2) pages).

Japanese-language Written Opinion (PCT/ISA/237) issued in PCT Application No. PCT/JP2015/052801 dated Apr. 7, 2015 (Three (3) pages).

\* cited by examiner

FIG.8

FACILITY INFORMATION TABLE 700

| FACILITY ID | | | | |
|---|---|---|---|---|

701

| FACILITY NAME | 711 |
| ADDRESS | 712 |
| TELEPHONE NUMBER | 713 |
| COORDINATE LOCATION | 714 |
| DISPLAY ICON | 715 |

VEHICLE EQUIPMENT

TECHNICAL FIELD

The present invention relates to a technique for vehicle equipment. The present invention claims priority from Japanese Patent Application No. 2014-62640 filed on Mar. 25, 2014, the contents of which are incorporated by reference herein in those designated states that allow incorporation by reference of literature.

BACKGROUND ART

A conventional technique is disclosed in Patent Literature 1 for an apparatus equipped with a display unit for displaying map information, an identification information imparting unit that imparts identification information to each of a plurality of voice input targets that are related to map information and can be input by voice, a display control unit for making the display unit display the voice input targets and respective identification information in association with each other, a voice recognition unit for voice-recognizing uttered identification information, and a screen switch unit for switching to the screen indicating the voice input target corresponding to the identification information that is voice-recognized by the voice recognition unit.

CITATION LIST

Patent Literature

Patent Literature 1: JP 2004-69424 A

SUMMARY OF INVENTION

Technical Problem

The above technique is capable of assisting a labor for setting a destination using voice recognition. However, the instruction to start voice recognition is unfortunately deviated from the timing intended by the utterer, failing to always contribute to the convenience of the user.

The object of the invention is to provide a technique for vehicle equipment that can be more easily operated by the user.

Solution to Problem

The invention includes a plurality of means for solving at least a part of the above problem. An example of the plurality of means will be described below. In order to solve the above issue, vehicle equipment according to the present invention includes a protrusion unit provided near at least one side among four sides forming an outer rim of a rectangular display having a touch panel, the protrusion unit being provided such that a long side of the protrusion unit is substantially in parallel with the one side, wherein a button is provided at least one of both ends of the protrusion unit in an extending direction of the long side, the button being capable of accepting an input in the extending direction of the long side of the protrusion unit.

Problems, configurations, and effects other than the above description will be apparent from the description of the following embodiments.

Advantageous Effects of Invention

The invention of the application makes it possible to provide a technique for vehicle equipment that can be more easily operated by the user.

BRIEF DESCRIPTION OF DRAWINGS

FIG. 8 is a diagram illustrating a data configuration of a facility information table.

DESCRIPTION OF EMBODIMENTS

Hereinafter, a navigation apparatus 1 that is vehicle equipment according to an embodiment of the invention will be described with reference to the drawings. Note that FIGS. 1 to 12 do not illustrate the entire configuration of the navigation apparatus 1 and a part of the configuration is omitted as appropriate for easy understanding.

Figure 1:
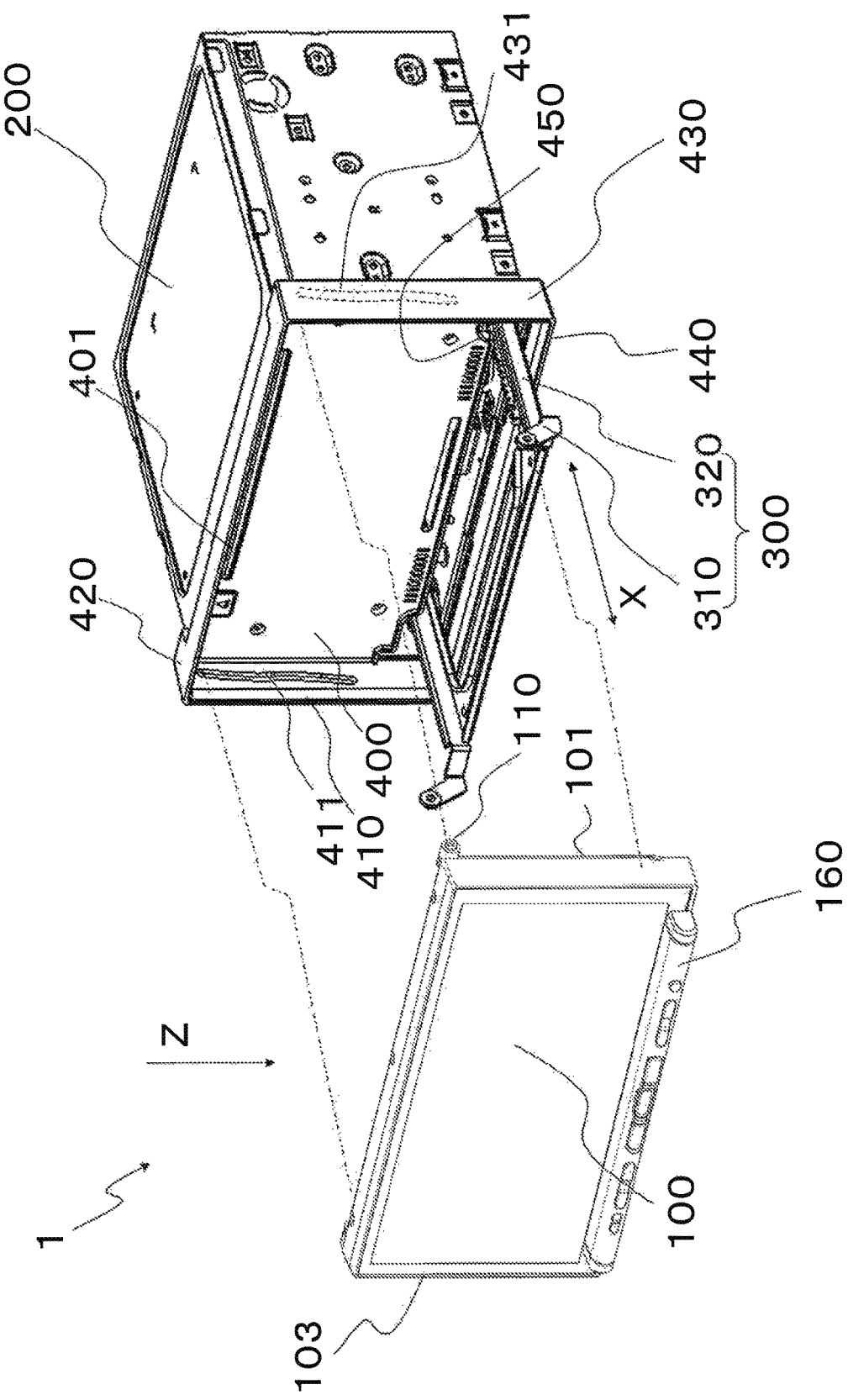
FIG. 1 is a diagram illustrating a configuration of a navigation apparatus according to a first embodiment.

FIG. 1 illustrates the structure of the navigation apparatus 1 according to a first embodiment. FIG. 1 is an exploded perspective view of the navigation apparatus 1. Note that an image display screen is disposed at a left front side in the drawing. Note that, hereinafter, "right" and "left" are used as references when the image display screen is located to be the front side.

As illustrated in FIG. 1, the navigation apparatus 1 includes a rectangular display unit 100 including the image display screen, a housing 200, a slide unit 300, and an inner escutcheon 400.

The display unit 100 stores a display substrate and a touch panel overlapped with the display substrate in a case having a flat and rectangular parallelepiped shape. Besides a display device such as a liquid crystal panel, a protrusion unit 160 equipped with hard switches for various operations is disposed on the image display screen of the display unit 100. Note that a portion of the front face, and the side faces of the display unit 100 are covered with a case made of a resin.

A right roller part 110 is provided on an upper portion of a display unit right face 101 that is a side face of the display unit 100 on the right side. Furthermore, a left roller part is provided on an upper portion of a display unit left face 103 that is a side face of the display unit 100 on the left side. Furthermore, display support portion attachment parts are provided to respective lower portions of the display unit right face 101 and the display unit left face 103.

The housing 200 is a box shape member having a surface opened on the side of the display unit 100. A drive unit for a CD or a DVD, a hard disc, a circuit board for performing various processing, etc. are stored in the housing 200.

Furthermore, although not illustrated, rails that become guides for slide-moving the slide unit 300, a motor for slide-moving the slide unit 300 as a driving source, a gear for transmitting the motor driving force of the motor to the slide unit 300, etc. are disposed in the housing 200.

The slide unit 300 includes an arm part 320 that slides along the rail in the housing 200, and a display support part 310 that is hinge combined with the display unit 100 to support the display unit 100. The arm part 320 is coupled with the motor via the gear, and slides in the directions perpendicular to the main face of the inner escutcheon 400 (X directions in FIG. 1) depending on the driving direction of the motor.

The display support part 310 is rotatably coupled with the display support portion attachment part of the display unit 100. For example, the display support part. 310 forms a hinge mechanism between with the display support portion attachment part, so that display unit 100 is capable of rotating about a coupling axis with the display support part 310.

On the other hand, the right roller part 110 provided on the upper portion of the display unit right face 101 is fitted in a right wall face groove 431 that is a groove extending in upper and lower directions provided inside a right wall face 430 that is a wall face of the inner escutcheon 400 on the right side. Furthermore, the left roller part provided on the upper portion of the display unit left face 103 is fitted in a left wall face groove 411 that is a groove extending in upper and lower directions provided inside a left wall face 410 that is a wall face of the inner escutcheon 400 on the left side.

Thus, the movement of the upper portion of the display unit 100 is limited in the upper and lower directions, so that the upper portion of the display unit 100 moves upper and lower directions while keeping a close position to the inner escutcheon 400 with the movement of the arm part 320 in the X directions.

The inner escutcheon 400 is a member for storing the display unit 100 in the housing 200, and has a box shape corresponding to the shape of the image display screen of the display unit 100 on the back side. The inner escutcheon 400 is formed of a rectangular main face, and wall faces of left, right, top, and bottom combined with respective four sides of the rectangular main face. The main face is a face opposing to the back face of the display unit 100 when the display unit 100 is stored. The four wall faces of left, right, top, and bottom are faces opposing the faces of left, right, top, and bottom of the display unit 100, respectively, when the display unit 100 is housed.

The left wall face groove 411 and the right wall face groove 431 are provided to the left wall face 410 and the right wall face 430 which are left and right inner wall faces of the inner escutcheon 400, respectively. The left roller part and the right roller part 110 provided to the left and right, faces 103, 101 of the display unit 100 is fitted in the left wall face groove 411 and the right wall face groove 431, respectively, to limit the slide movement in only the upper and lower directions. When the display unit 100 performs a tilt operation, the left roller part and right roller part 110 of the display unit 100 slide in the upper direction or the lower direction along the left wall face groove 411 and right wall face groove 431, respectively.

The inner escutcheon 400 is provided, with a disc insertion portion 401 capable of insertion and extraction of a disc such as a CD or a DVD. The inner escutcheon 400 is also provided with a slide member opening 450 that allows the arm part 320 of the slide unit 300 to pass through.

The inner escutcheon 400 is fitted in a mouth-shaped opening portion of the housing 200 on the side of the display unit 100.

That is, when the display unit 100 is tilted, the lower portion of the display unit 100 is pulled away from the inner escutcheon 400 depending on the protrusion of the slide unit 300 in the direction of the image display screen. In contrast, the upper portion of the display unit 100 moves in the lower direction while being adjacent to the inner escutcheon 400, so that the display unit 100 is inclined to gradually become the level state. This makes the disc insertion portion 401 be exposed, allowing the user to exchange a CD or a DVD.

The navigation apparatus 1 of the embodiment, which is configured as described above, further has the following characteristic configurations. As described above, in the navigation apparatus 1, the protrusion unit 160 provided in the case of the display unit 100 is protruded from the image display screen. The protrusion unit 160 is provided with hard switches for accepting various input operations such as a volume switch that accepts instructions about magnitude of volume of output voice, and a present location button that accepts an instruction to switch the image display screen to present location display. That is, the protrusion unit 160 is provided at a portion on the display screen of the rectangular display, the portion being excluded from an area that detects a touch to the touch panel.

The protrusion unit 160 is the one that is provided near at least one side among four sides forming the outer rim of the rectangular display having the touch panel, the protrusion unit being provided such that a long side of the protrusion unit is substantially in parallel with the one side.

Figure 2:
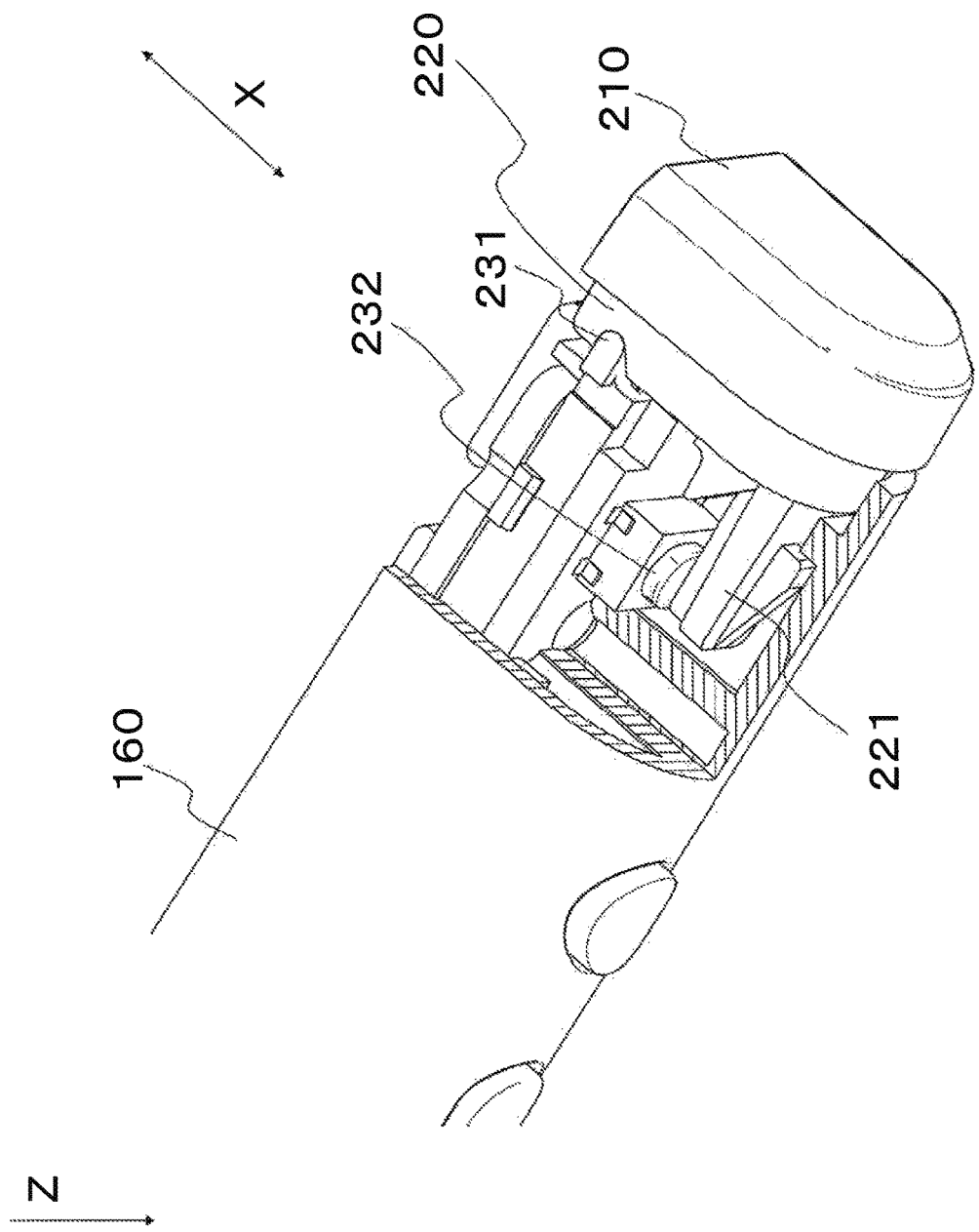
FIG. 2 is a diagram illustrating an inner structure of a protrusion unit.

A trigger button 210 is provided at at least one of both ends of such a protrusion unit 160 in an extending direction of the long side, the trigger button 210 being capable of accepting an input in an extending direction of the long side of the protrusion unit 160 (see FIG. 2). The trigger button 210 is provided so as to be offset by a predetermined distance from another side among the main four sides forming the outer rim of the display unit 100, the another side being in contact with the one side at a right angle. That is, the trigger button 210 is provided inside the outer rim of the display unit 100, lowering the possibility of being pressed by mistake and allowing easy detection by touch without look.

The trigger button 210 is provided at one of the both ends of the protrusion unit 160 in the extending direction of the long side, the one of the both ends being nearer to the driving seat of the vehicle mounting thereon the navigation apparatus 1. For example, in the case where the driving seat is located on the right side, the trigger button 210 is provided on the right side of the protrusion unit 160.

Operation of the trigger button 210 by the driver allows the navigation apparatus 1 to start a sound collection for voice recognition by a sound recognition function. The description of the processing that is performed when an input to the trigger button 210 is accepted will be described later.

Figure 3:
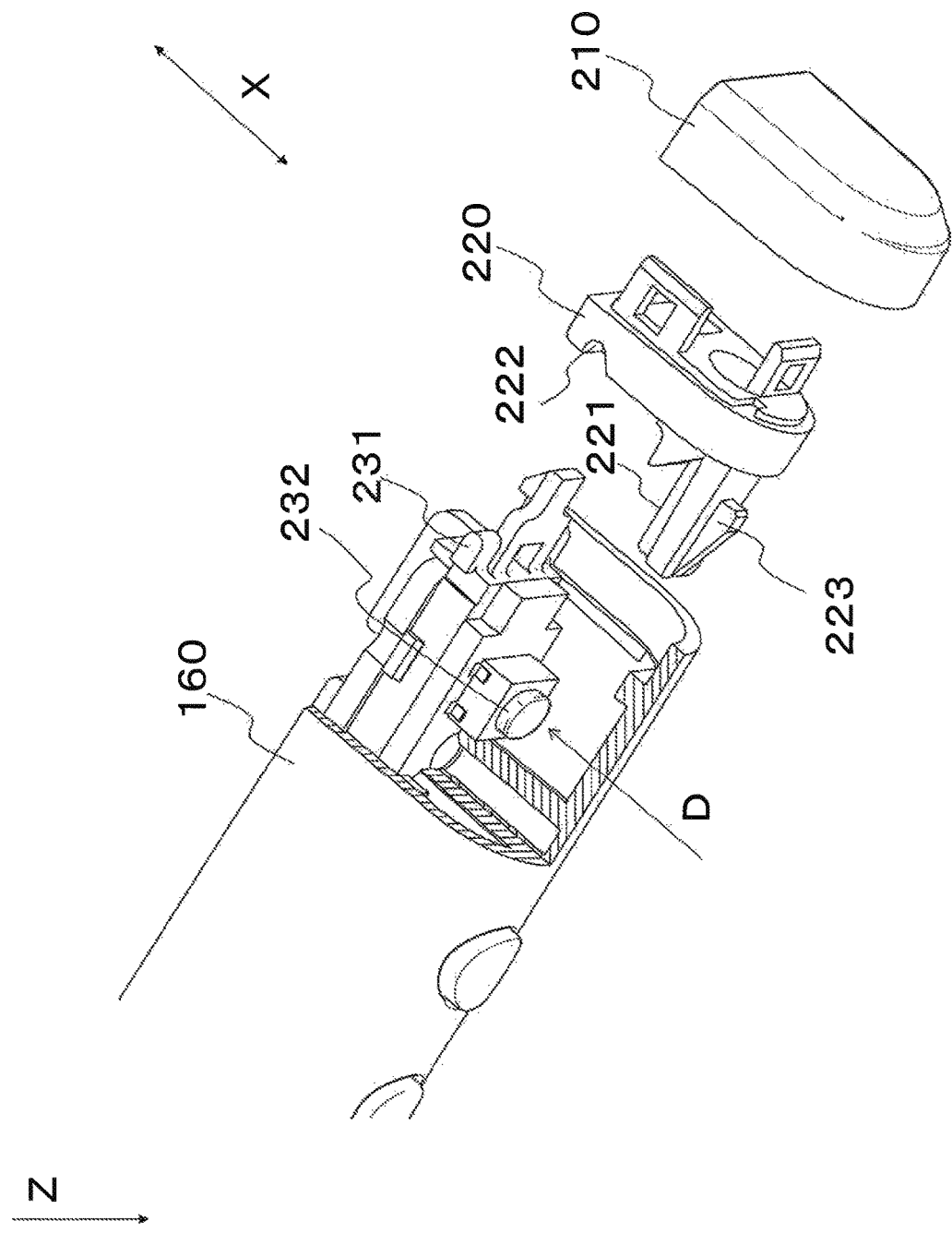
FIG. 3 is a diagram illustrating an assembly structure of the protrusion unit.

FIGS. 2 and 3 are diagrams illustrating an inner structure of the protrusion unit 160. The trigger button 210 provided at the right end of the protrusion unit 160 includes an arm 221 that presses a switch 232 provided inside the protrusion unit 160 in a d direction (see FIG. 3), and a button seat part 220 connected to the arm 221 at an approximate right angle. Note that the d direction is the direction oriented on the back side in the drawing of the X directions.

The switch 232 is provided with a switch seat convex portion 231 that is made contact with a button seat concave portion 222 provided in the button seat part 220. This forms a hinge structure in which the button seat concave portion 222 and the switch seat convex portion 231 are a rotational axis. That is, the force applied to the button seat part 220 in the extending direction of the long side of the protrusion unit 160 is changed in the movement direction into a circular motion of the arm 221 in which the hinge is the rotational center. Then, with the circle motion of the arm 221, the switch 232 receives a force in the D direction by the arm 221. This makes the switch 232 to accept an input.

Note that the arm 221 is provided with a fall off prevention projection 223 to prevent fall off of the button seat part 220 (see FIG. 3). When the arm 221 receives a force in the reverse direction of the D direction returned from the switch 232, the fall off prevention projection 223 is capable of preventing the arm 221 from being returned by the force and the trigger button 210 from falling off.

Figure 4:
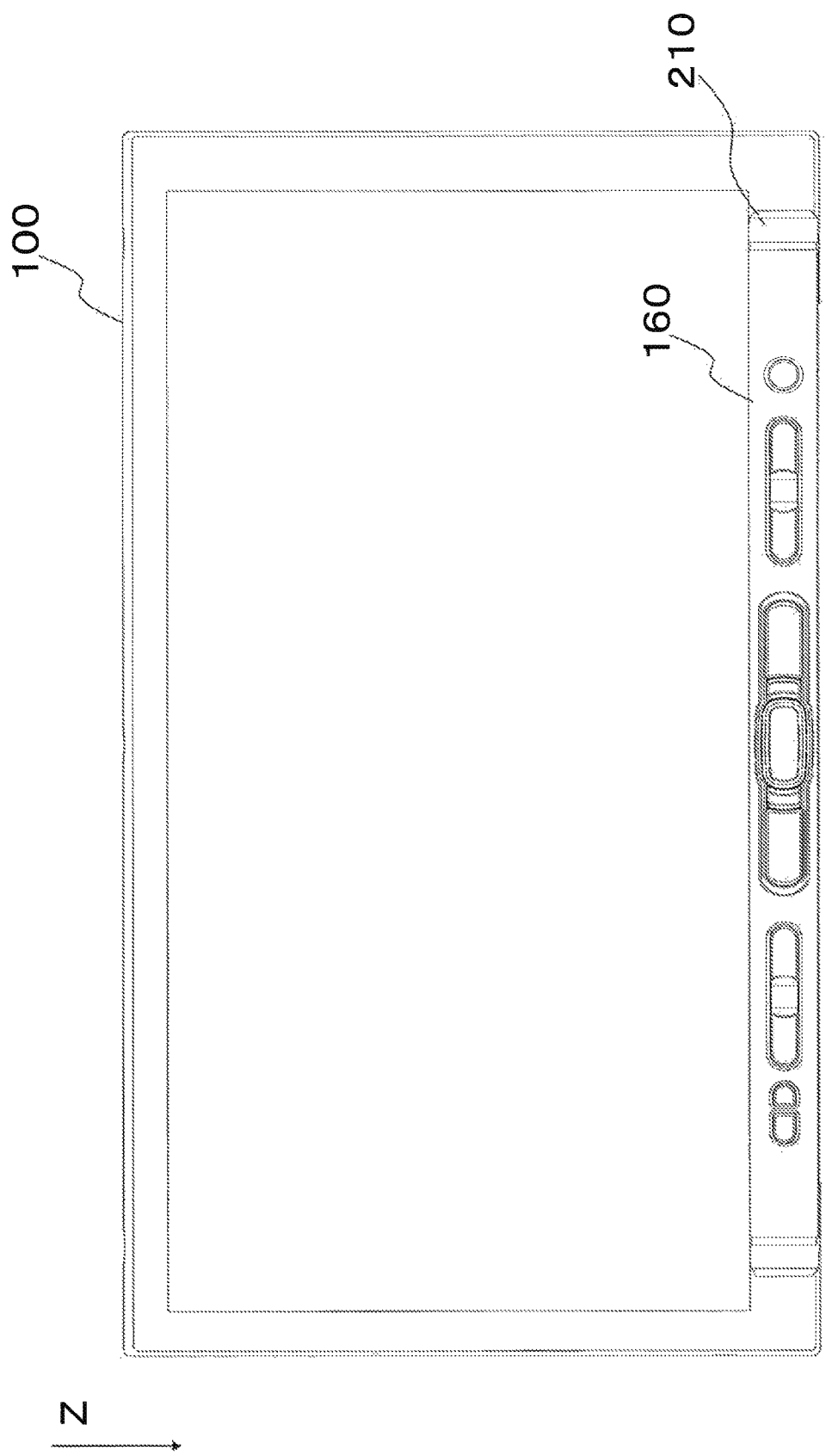
FIG. 4 is an elevation view of the navigation apparatus.

FIG. 4 is an elevation view of the navigation apparatus 1. The front side of the navigation apparatus 1 is the front side of the display unit 100. In the embodiment, the protrusion unit 160 is provide along the lower side of the case of the display unit 100, and the trigger button 210 is provided so as to be able to be pressed in the left direction at the right end of the protrusion unit 160. The trigger button 210 is provided so as to be offset inside the right end of the display unit 100.

Figure 5:
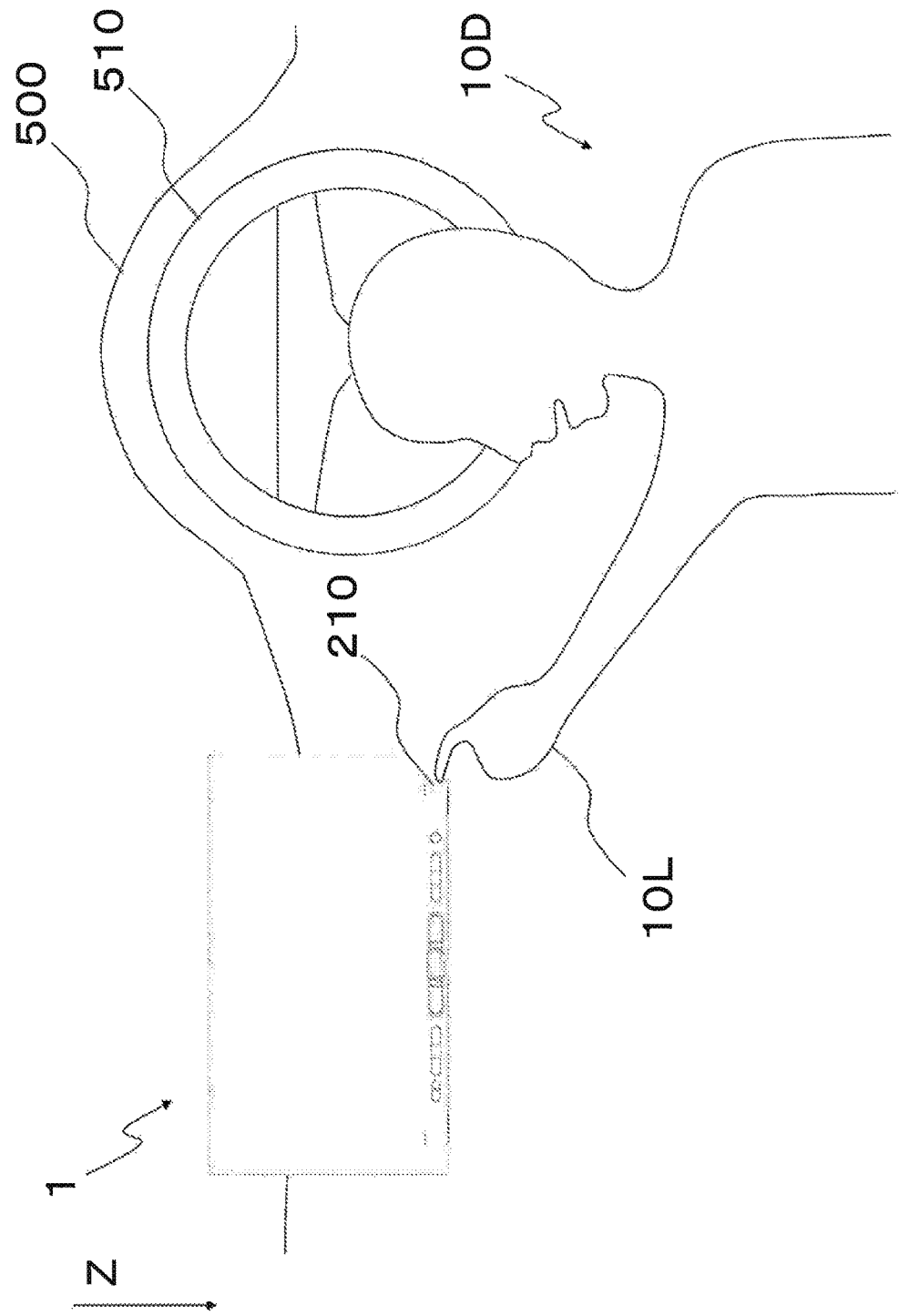
FIG. 5 is a diagram illustrating a positional relationship between the user and the navigation apparatus in a disposed state
Figure 6:
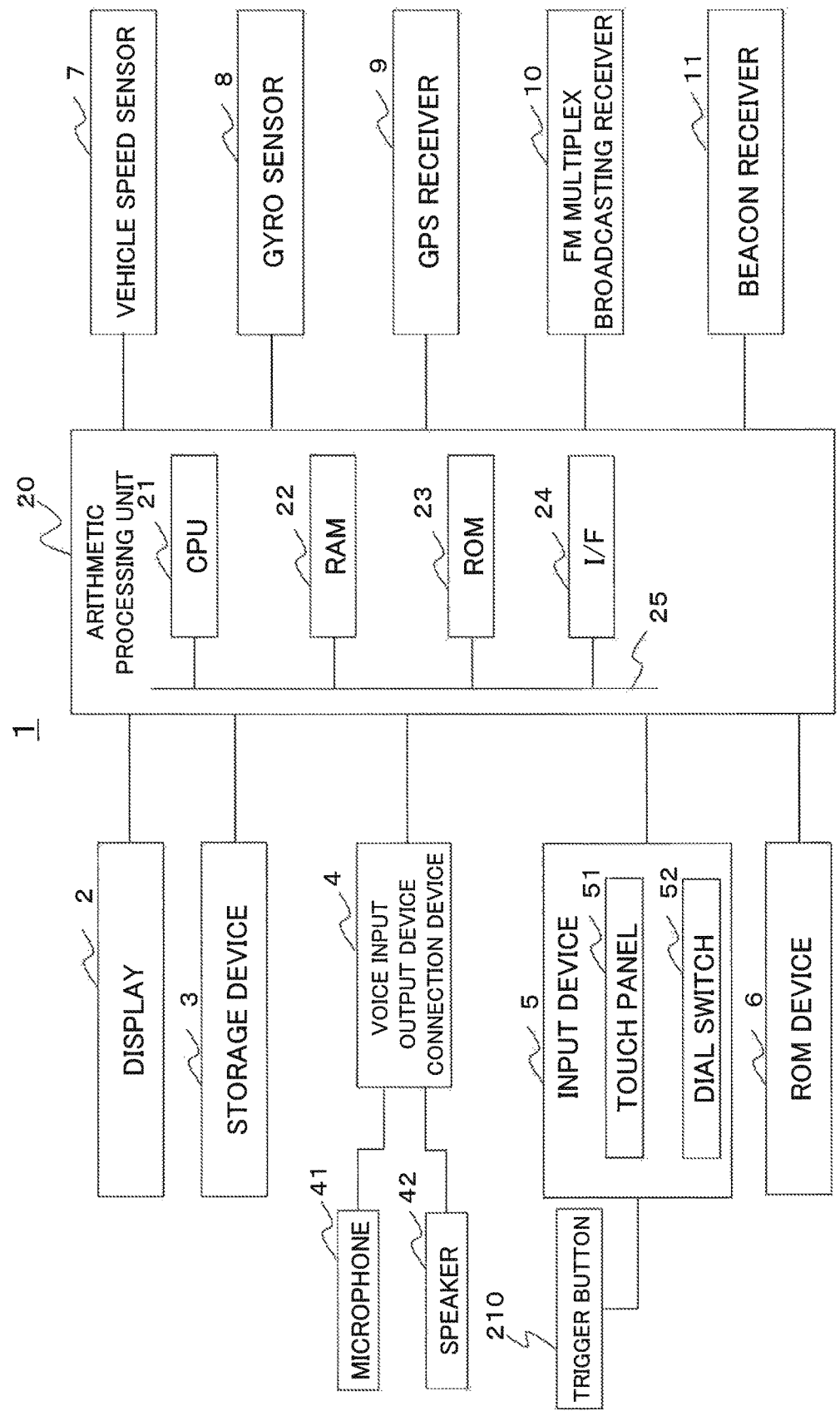
FIG. 6 is a schematic block diagram of the navigation apparatus.

As shown in FIG. 5, the navigation apparatus 1 is disposed at, for example, a position that allows a driver 10D of the vehicle to perform operation. The driver 10D performs various driving operations on a driving seat 500 during moving of the vehicle using a steering 510 or the like. During the operations, the driver 10D performs driving while obtaining visible information in the moving direction (mainly, front side in the traveling direction of the vehicle). Thus, in the state where the driver 10D is oriented in the front side of the moving direction, the circumstance provably happens in which the hand 10L of the driver 10D nearer to the navigation apparatus 1 (for example, left hand in the case of the vehicle having the driving seat on the right side) is made contact with the navigation apparatus 1 for operation. In such a case, the trigger button 210 exists at the right end of the protrusion unit 160 protruding from the image display screen, allowing the driver to operate the trigger button 210 while reducing movement of line of sight. Furthermore, the trigger button 210 is offset from the outer rim of the display unit 100, allowing the driver to further readily detect the position of the trigger button 210 without wastefully moving line of sight FIG. 6 is a schematic block diagram of the navigation apparatus 1. The navigation apparatus 1 is a so called navigation apparatus capable of indicating a point indicating the present location of the navigation apparatus 1 and information for guiding the route to a set destination by displaying map information.

The navigation apparatus includes an arithmetic processing unit 20, a display 2, a storage device 3, a voice input output device connection device 4 (as for a voice input device, an external microphone 41, as for a voice output device, an external speaker 42 can be connected thereto), an input device 5, a ROM device 6, a vehicle speed sensor 7, a gyro sensor 8, a global positioning system (GPS) receiver 9, an FM multiplex broadcasting receiver 10, and a beacon receiver 11.

The arithmetic processing unit 20 is a core unit for performing various processing. For example, the arithmetic processing unit 20 detects the present location on the basis of the information output from various sensors 7, 8, the GPS receiver 9, the FM multiplex broadcasting receiver 10, etc. The arithmetic processing unit 20 also reads out map data necessary for display from the storage device 3 or the ROM device 6 on the basis of the obtained present location information.

The arithmetic processing unit 20 performs graphic development to the read out map data to display on the display 2 a mark indicating the present location to overlap with the map. The arithmetic processing unit 20 also retrieves the most suitable route (recommended route) connecting the departure point (present location) and the destination (or transit point or stop-off point) instructed by the user by using the map data or the like stored in the storage device 3 or the ROM device 6. The arithmetic processing unit 20 also guides the user by using the speaker 42 or the display 2. The arithmetic processing unit 20 also accepts various operation inputs in operations using various functions such as route detection depending on situations.

In the arithmetic processing unit 20, the devices are connected via a bus 25. The arithmetic processing unit 20 has a central processing unit (CPU) 21 for performing various processing such as numerical operation and control of the devices, a random access memory (RAM) 22 for storing map data, arithmetic data, etc. read out from the storage device 3, a read only memory (ROM) for storing a program and data, and an interface (I/F) 24 for connecting various hardware to the arithmetic processing unit 20.

The display 2 is a unit for displaying graphic information generated by the arithmetic processing unit 20, etc. The display 2 is formed of a liquid crystal display, an organic electro luminescence (EL) display, or the like.

The storage device 3 is formed of a storage medium capable of at least reading and writing such as a hard disk drive (HDD) or a non-volatile memory. A link table 600 that is map data (including link data of link forming roads on the map) necessary for a normal route retrieval device, and a facility information table 700 storing, for each of facilities, detailed facility information, icon image information associated with the facility, etc.

Figure 7:
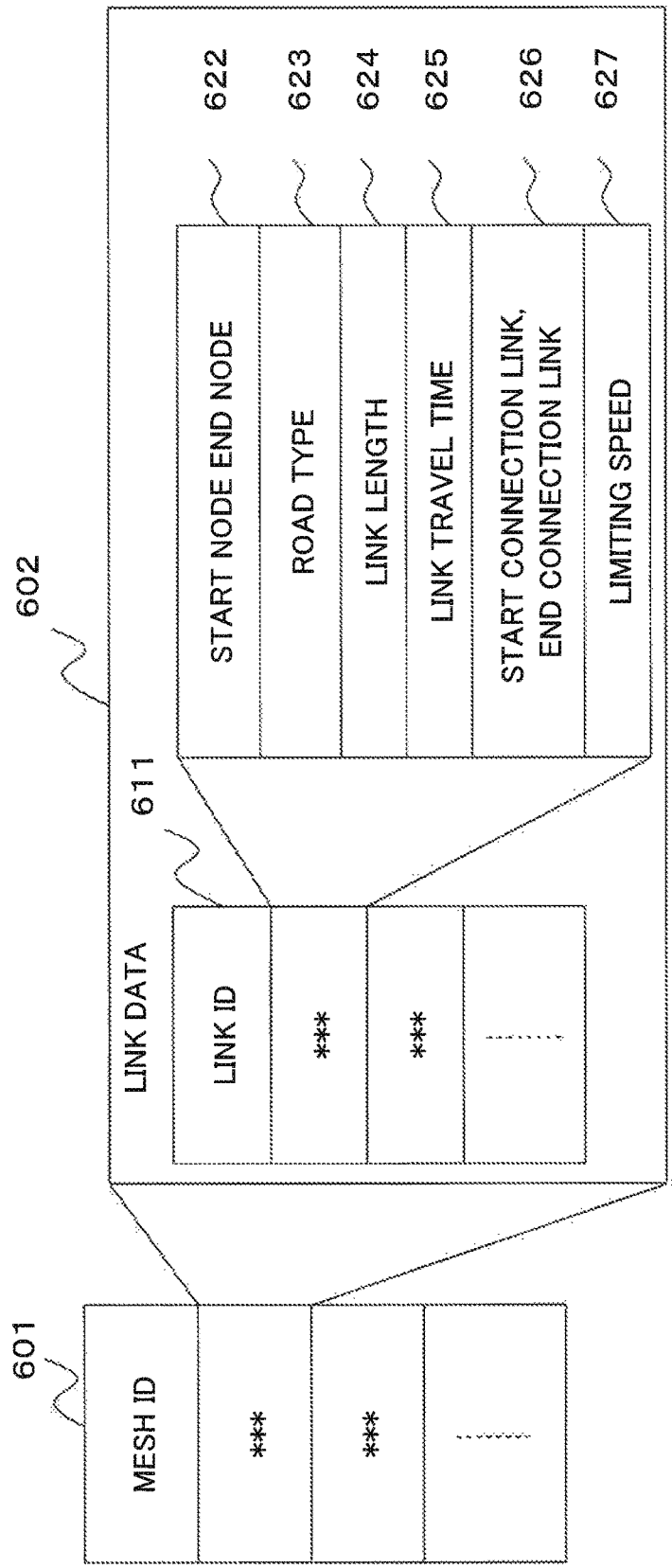
FIG. 7 is a diagram illustrating a data configuration of a link table.

FIG. 7 is a diagram illustrating the configuration of the link table 600. The link table 600 includes, for each of identification codes (mesh IDs) 601 that is an area partitioned on the map, link data 602 for each link forming the road included in the corresponding mesh area.

The link data 602 includes, for each of link ID 611 that is indentifier of the link, coordinate information 622 of two nodes (start node end node) forming a link, a road type 623 for indicating the type of the road including the link, a link length 624 indicating the length of the link, a link travel time 625 preliminarily stored, a start connection link, end connection link 626 for specifying a start connection link that is a link to be connected to the start node of the link and an end connection link that is a link to be connected to the end node of the link, a limiting speed 627 indicating the limiting speed of the road including the link, etc. Note that, the two nodes forming a link, which are a start node and an end node, are distinguished herein to thereby manage upward direction and downward direction of the same road as different links to each other.

FIG. 8 is a diagram illustrating the configuration of the facility information table 700. The facility information table 700 stores facility IDs 701 that are information for specifying facility, and detailed information of the facility associated with each of the facility IDs 701. Specifically, the detailed information of facility includes the information of a facility name 711, an address 712, a telephone number 713, a coordinate location 714, and a display icon 715.

In the facility ID 701, an identifier for identifying a facility is stored. For example, as for chain stores or the like, an identifier associated with corresponding one of the stores is stored in the facility ID 701. That is, even when a store is one of chain stores, the store is associated with an identifier as a facility different from the other stores, and the identifier is stored in the facility ID 701.

In the facility name 711, the name of the facility associated with the facility ID is stored. For example, the facility name 711 includes the name or the trade name of the store. In the address 712, the address of the facility is stored. In the telephone number 713, the telephone number capable of making a contact with the facility is stored. For example, the telephone number 713 includes the pilot number of the facility. In the coordinate location 714, the coordinate information (longitudinal and latitude information) of the facility is stored. Furthermore, in the display icon 715, an image for indicating the emblem for identifying the facility such as the logo or the signboard of the facility is stored. Note that the display icon 715 may be an icon including the trade name or the like inherent to the facility, or may be an icon specifying a group having a capital relationship or the like.

Back to FIG. 6 for description. The voice input output device connection device 4 is capable of being connected to the microphone 41 as a voice input device and the speaker 42 as a voice output device. The microphone 41 acquires a voice outside the navigation apparatus 1 such as a voice uttered by the user or another passenger. The speaker 42 outputs a message to the user generated by the arithmetic processing unit 20 as a voice. The microphone 41 and the speaker 42 are differentially disposed at predetermined portions of the vehicle. However, the microphone 41 and the speaker 42 may be stored in one housing. The navigation apparatus 1 may have a plurality of microphones 41 and a plurality of speakers 42 connected thereto.

The input device 5 is a device for accepting instructions from the user through operations by the user. The input device 5 includes a touch panel 51, a dial switch 52, a scroll key and a scale change key that are other hard switches (not shown), etc. The touch panel 51 is mounted on the display screen side of the display 2, and allows the display screen to be seen through. The touch panel 51 specifies the touch position corresponding to XY coordinates of the image displayed on the display 2 and converts the touch position into the coordinates for output. The touch panel. 51 is formed of an input detection element of a pressure-sensitive type or an electrostatic type, etc. The dial switch 52 is capable of being rotated in a clockwise direction or an anticlockwise direction, and generates a pulse signal for each rotation equivalent to a predetermined angle to output the pulse signal to the arithmetic processing unit 20. The arithmetic processing unit 20 obtains the rotational angle depending on the number of the pulse signal.

The ROM device 6 is formed of a recording medium capable of at least reading such as a read only memory (ROM) such as a CD-ROM or a DVD-ROM, or an integrated circuit (IC) card. For example, video data, voice data, etc are stored in the storage device.

The vehicle speed sensor 7, the gyro sensor 8, and the GPS receiver 9 are used to detect the present location (car position) by the navigation apparatus 1. The vehicle speed sensor 7 is a sensor for outputting a value used to calculate the vehicle speed. The gyro sensor 8 is formed of an optical fiber gyro, an oscillation gyro, or the like, and detects the angular speed by rotation of the moving body. The GPS receiver 9 measures the distance between the moving body and an GPS satellite and change rate of the distance by receiving a signal from the GPS satellite for each of not less than three satellites to thereby measure the present location, the traveling speed, and the traveling direction of the moving body. Note that the GPS receiver 9 may be another device as long as it is a positioning device. For example, the positioning device may be a global navigation satellite system (GLONASS), etc., or may be a hybrid type used in conjunction with the GLONASS, etc. Alternatively, the positioning device may have a function of correcting the position by an acceleration sensor.

The FM multiplex broadcasting receiver 10 receives FM multiplex broadcasting signal. The FM multiplex broadcasting includes traffic regulation information, service area/ parking area (SA/PA) information, parking area information, weather information, and character information provided by a radio station as FM multiplex general information.

The beacon receiver 11 receives schematic present state traffic information, regulation information, service area/ parking area (SA/PA) information, parking area information, weather information, urgency information, etc. such as VICS information. The beacon receiver 11 is a receiver such as an optical beacon receiver that communicates by light, a radio wave beacon receiver that communicates by radio wave.

Figure 9:
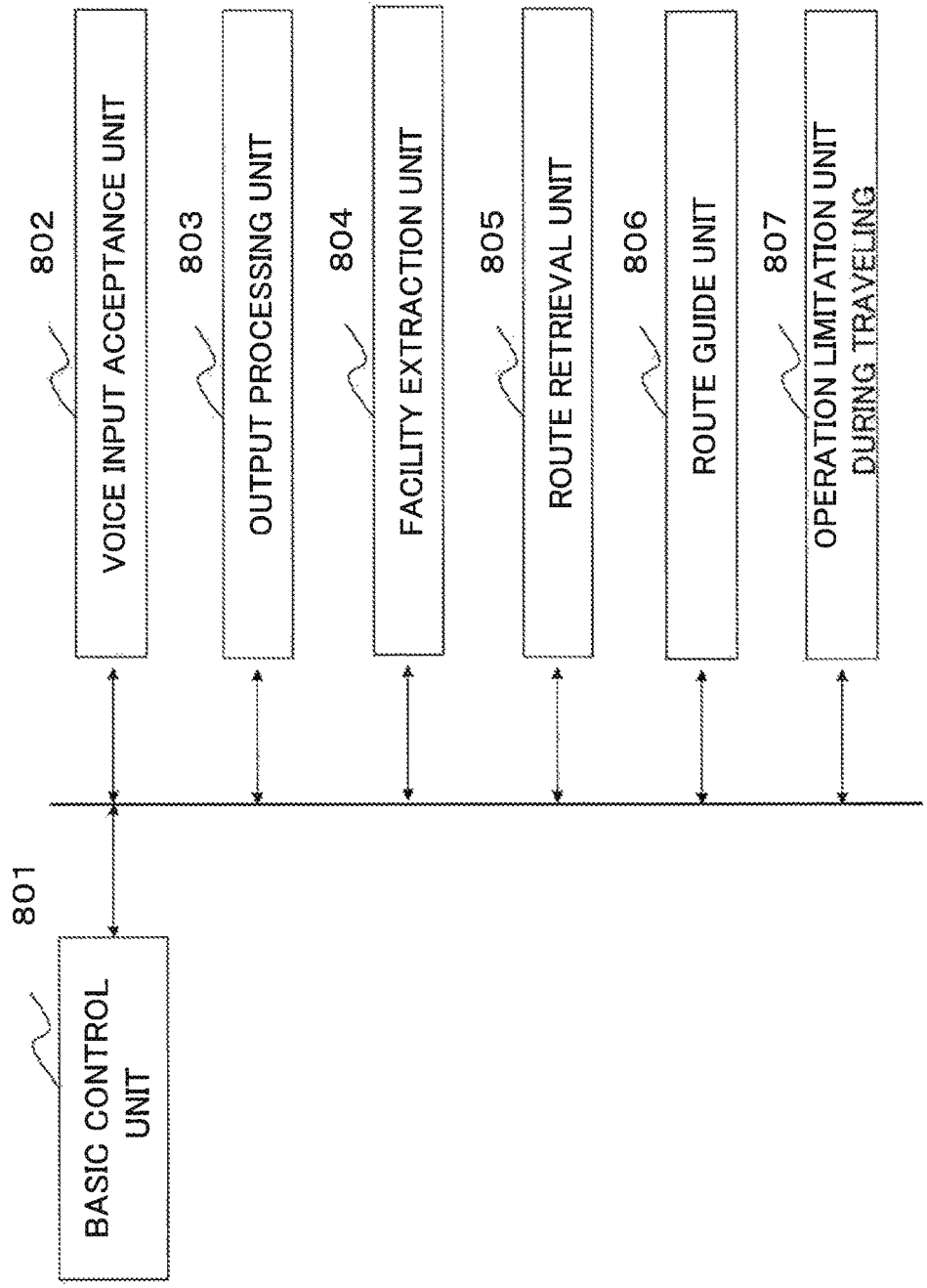
FIG. 9 is a function block diagram of an arithmetic processing unit.

FIG. 9 is a function block diagram of the arithmetic processing unit 20. As illustrated in FIG. 9, the arithmetic processing unit 20 includes a basic control unit 801, a voice input acceptance unit 802, an output processing unit 803, a facility extraction unit 804, a route retrieval unit 805, a route guide unit 806, and an operation limitation unit during traveling 807.

The basic control unit 801 is a core function unit for performing various processing, and controls other processing units depending on the content of processing. The basic control unit 801 also acquires information from various sensors, GPS receiver 9, etc. and identifies the present location and the orientation of the vehicle by performing map matching processing, etc. The basic control unit 801 also accepts instructions from the user input via the input device 5 and controls each unit of the arithmetic processing unit 20 to perform the processing corresponding to the requested content. For example, the basic control unit 801 requests the output processing unit 803 to display a map on the display 2 to set a destination when the user requests retrieval of recommended route.

The voice input acceptance unit 802 accepts instructions from the user input via the microphone 41, and controls each unit of the arithmetic processing unit 20 to perform the processing corresponding to the requested content. For example, when the user requests retrieval of recommended route by voice, the voice input acceptance unit 802 requests the output processing unit 803 to display a map on the display 2 to set a destination. Alternatively, when the user requests retrieval of the facility that is a destination or a transit point by voice, the voice input acceptance unit 802 requests the facility extraction unit 804 to retrieve the facility, and asks the user whether the extracted result is identified as the facility of the destination or the like.

The output processing unit 803 receives screen information for display, for example, polygon information, converts the polygon information into a signal for drawing on the display 2, and instructs the display 2 to perform drawing.

The facility extraction unit 804 extracts the facility satisfying extraction conditions. Specifically, the facility extraction unit 804 identifies, for an input voice input to and accepted by the voice input acceptance unit 802, a keyword such as the name of the facility by performing language recognition processing, and extracts the corresponding facility from the facility information table 700. The facility extraction unit. 804 also lists the extracted facilities in order of proximity from the present location. Note that the facility extraction unit 804 may extract a neighboring facility located from a specified point regardless of the present location. The facility extraction unit 804 may extract the facility in the area between not less than a predetermined distance and less than a predetermined distance from the present location by using the coordinate location 714 of the facility.

The route retrieval unit 805 performs retrieval processing of the optimum route (recommended route) from the starting point (present location) for the facility input or input by voice by the user.

The route guide unit 806 guides the recommended route retrieved by the route retrieval unit 805 or another recommended route by outputting an arrow or the like to the route from the present location to the destination or the next transit point.

The operation limitation unit during traveling 807 discards the operation information to ignore the operation information and makes the display 2 display a predetermined error massage (for example, "screen operation is forbidden") etc. when the operation is performed that is limited while the moving body mounting thereon the navigation apparatus 1 is traveling (when the position specified by the coordinate information moves at a speed not less than a predetermined speed)

The above each function unit of the arithmetic processing unit 20, that is, the basic control unit 801, the voice input acceptance unit 802, the output processing unit 803, the facility extraction unit. 804, the route retrieval unit 805, the route guide unit 806, and the operation limitation unit during traveling 807 is formed by the CPU 21 that reads out and executes a predetermined program. To this end, the RAM 22 stores a program for executing the processing of each function unit. The program is also stored in the ROM 23, the storage device 3, or the ROM device 6.

Note that the above constituent elements of the navigation apparatus 1 are sorted depending on the main processing contents for easy understanding. Consequently, the present invention is not limited by the way of sorting the constituent elements and their names. The navigation apparatus 1 may be sorted into further more constituent elements depending on processing contents. Alternatively, the navigation apparatus 1 may be sorted such that one constituent element performs further more processing. Alternatively, each of the function unit may be formed of hardware (ASIC, CPU, etc.). Alternatively, processing by each function unit may be performed by one hardware, or may be performed by a plurality of hardware items.

[Description of Operations]

Figure 10:
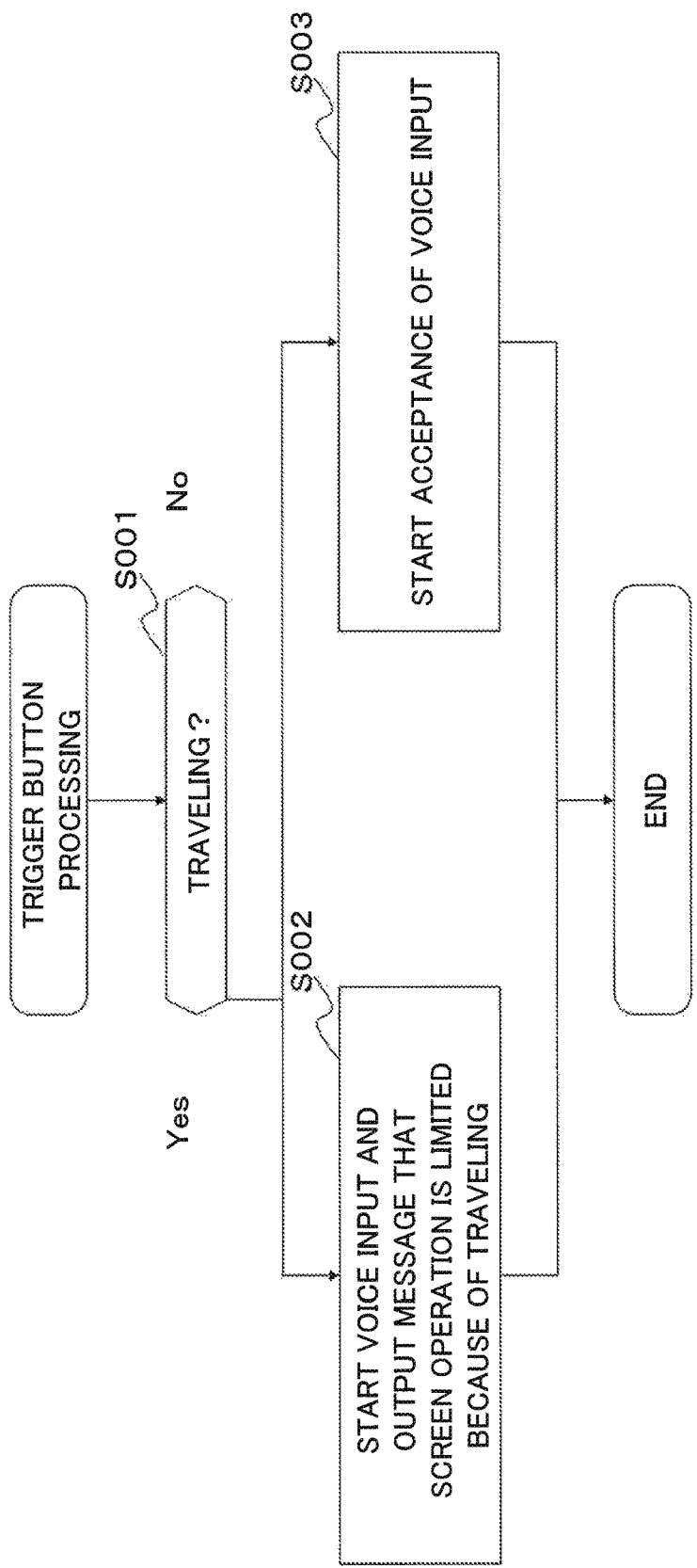
FIG. 10 is a flowchart illustrating a trigger button processing.

Next, operations of the navigation apparatus 1 will, be described. FIG. 10 is a flowchart illustrating, a trigger button processing of the navigation apparatus 1. The flow starts when the navigation apparatus 1 is activated and the trigger button 210 receives an input.

First, the operation limitation unit during traveling 807 determines whether the vehicle is traveling (step S001) Specifically, the operation limitation unit during traveling 807 asks the moving speed to the basic control unit 801 and determines that the vehicle is traveling when the moving speed is not less than a predetermined speed. Alternatively, the operation limitation unit during traveling 807 asks the coordinates indicating the present location to the basic control unit 801 and determines that the vehicle is traveling when the coordinates are changed by not less than predetermined values in a predetermined period.

When the vehicle is traveling ("Yes" in step S001), the operation limitation unit during traveling 807 outputs the massage that the screen operations are limited because of traveling and only voice input operations are accepted to start acceptance of a voice input (step S002). Specifically, the operation limitation unit during traveling 807 instructs the output processing unit 803 to display a massage such as "screen operations are limited" on the display 2. Alternatively, the operation limitation unit during traveling 807 instructs the output processing unit 803 to output a vice message such as "Screen operations are limited. Please start voice input." from the speaker 42. Then, the operation limitation unit during traveling 807 instructs the voice input acceptance unit 802 to start voice input. Then, the operation limitation unit during traveling 807 ends the trigger button processing.

When the vehicle is not traveling ("No" in step S001), the operation limitation unit during traveling 807 starts acceptance of voice input (step S003). Specifically, the operation limitation unit during traveling 807 instructs the voice input acceptance unit 802 to start voice input. Then, the operation limitation unit during traveling 807 ends the trigger button processing.

The flow of the trigger button processing is as described above. The trigger button processing makes it possible to start sound collection for voice recognition while limiting the operation such as normal screen input when the vehicle is traveling, and output an instruction to start sound collection for voice recognition when the vehicle is not traveling.

The configuration and the processing content of the navigation apparatus 1 according to the first embodiment are as described above. The first embodiment makes it possible to suppress burden of the user performing driving operation and perform adequate voice recognition.

However, the invention is not limited to the above embodiment. Various modifications can be made to the above first embodiment within the scope of the technical idea of the invention.

For example, in the first embodiment, the trigger button 210 is provided at the right one of both ends of the protrusion unit 160, but this is not limited to thereto, and a protrusion unit 160 may be employed having a button having the structure similar to that of the trigger button 210 also at the left end. The button at the left end, that is, the button located at the far end from the driving seat is difficult to be operated by the driver 10D, so that the button at the left end may output an instruction that is frequently performed as the operation from the operator on the passenger seat and that is different from the instruction output from the trigger button 210. For example, the button at the end opposite to the trigger button 210 may output an instruction to tilt the display unit 100 upon reception of input.

Figure 11:
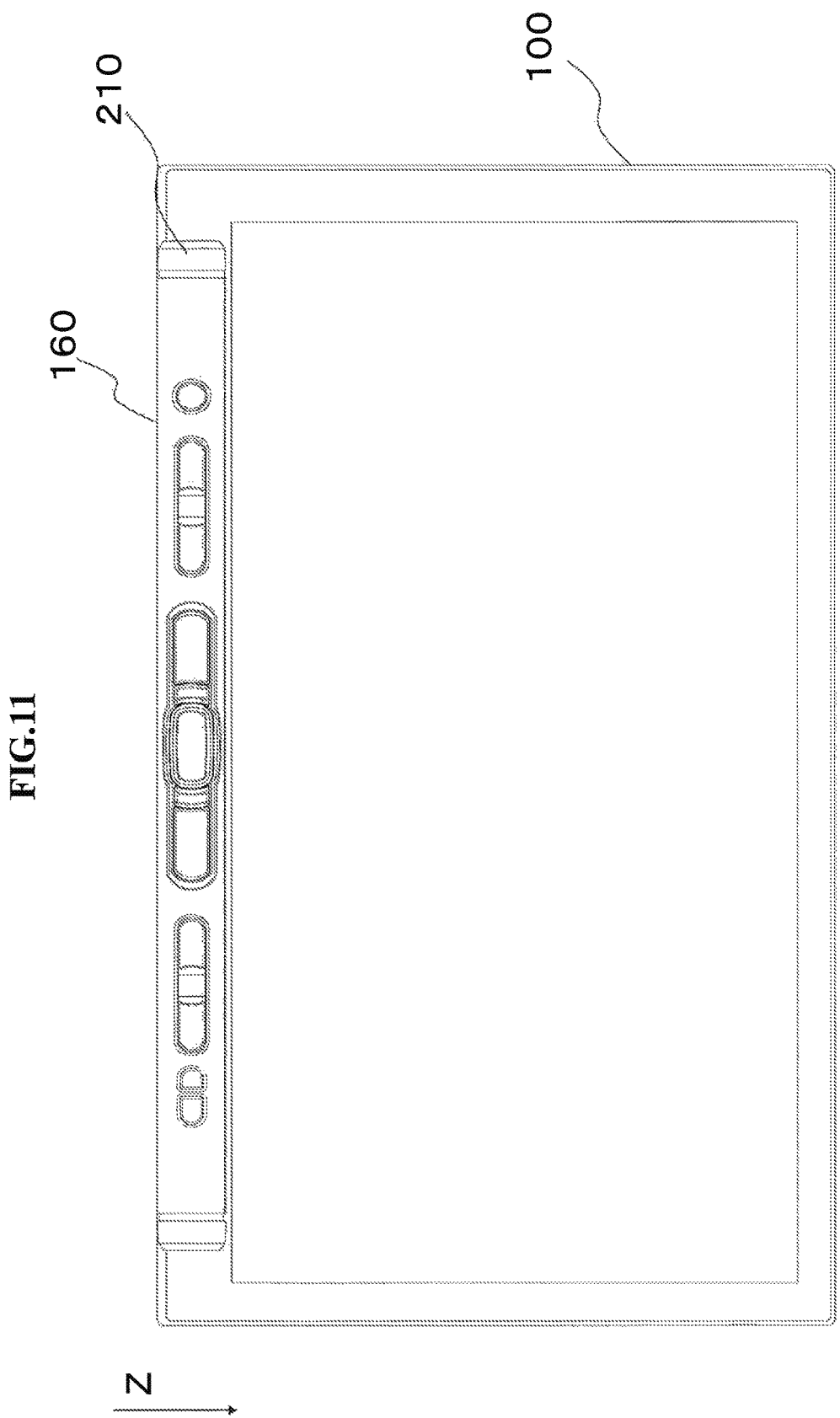
FIG. 11 is an elevation view of a navigation apparatus according to another embodiment.

Alternatively, as illustrated in FIG. 11, the protrusion unit 160 may be provided along the side forming the upper end of the display unit 100 among the four sides forming the outer rim of the display unit 100. Also in this case, it is desirable that the trigger button 210 be provided at the end on the side nearer to the driver 103.

Figure 12:
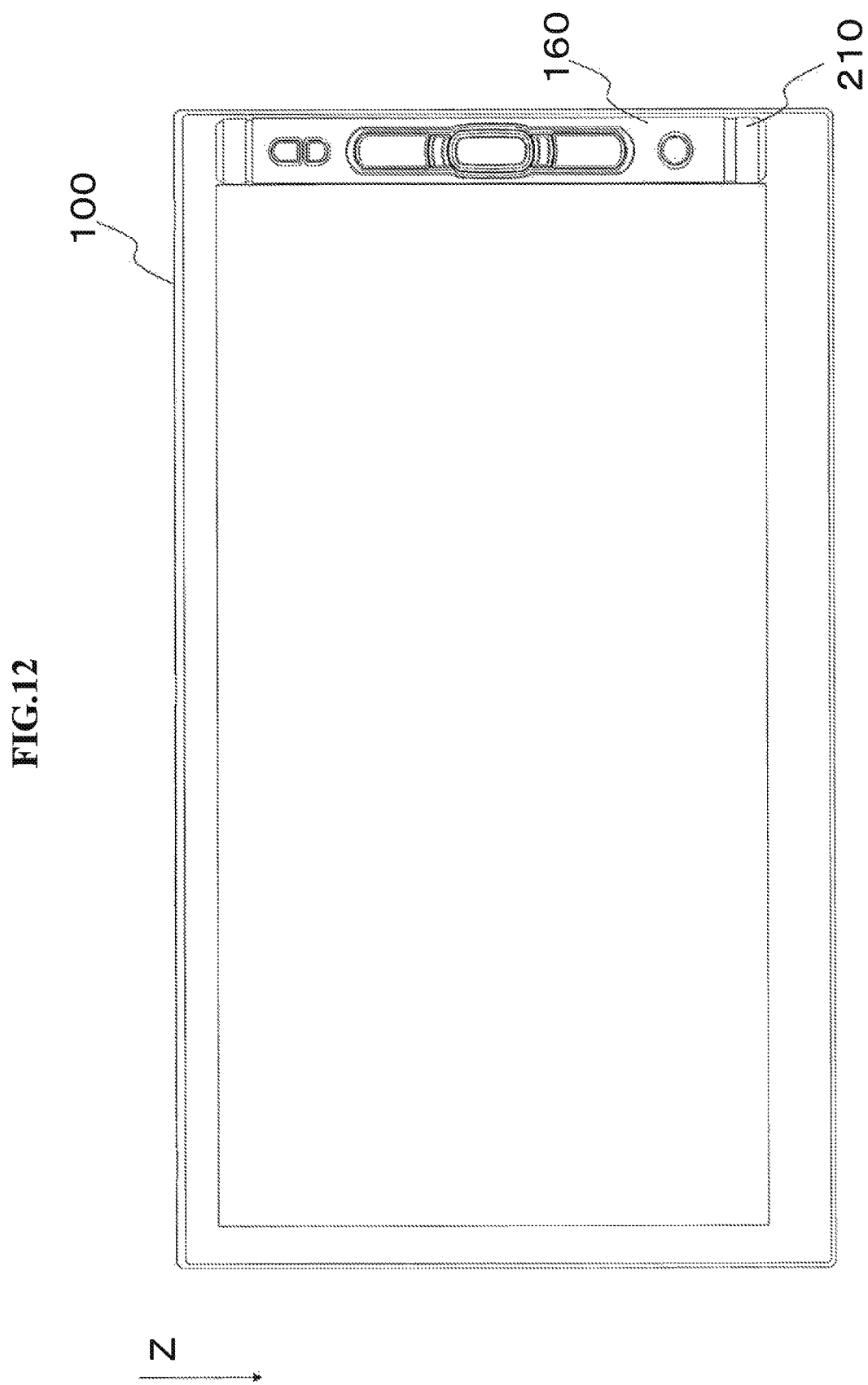
FIG. 12 is an elevation view of a navigation apparatus according to a still another embodiment.

Alternatively, as illustrated in FIG. 12, the protrusion unit 160 may be provided along the side forming the right end of the display unit 100 among the four sides forming the outer rim of the display unit 100. In this case, it is desirable that the trigger button 210 be provided at the end on the side nearer to the driver 103, that is, the lower end of the protrusion unit 160. However, when the end on the side nearer to the driver 103 is the upper end, it is desirable that the trigger button 210 be provided at the upper end.

When the trigger button 210 accepts an operation, one operation or the plurality of operations described below may be performed. Such examples will be described using a second embodiment.

Figure 13:
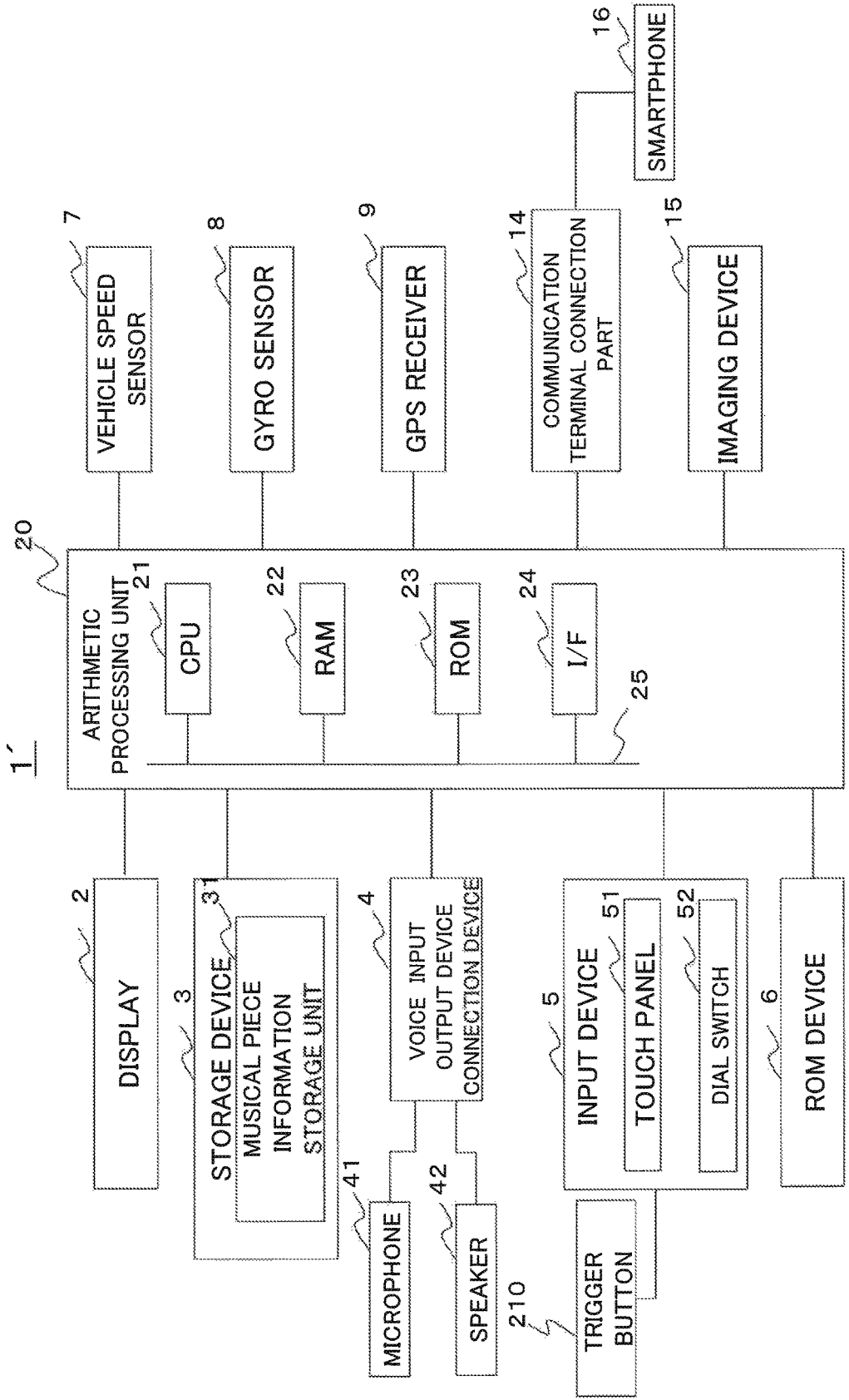
FIG. 13 is a schematic block diagram of a navigation apparatus according to a second embodiment.

As illustrated in FIG. 13, a navigation apparatus according to the second embodiment basically has the configuration approximately similar to that of the first embodiment, but is different in a part of the configuration. In the embodiment, a configuration different from that of the first embodiment will be mainly described.

A communication terminal connection part 14 and an imaging device 15 are connected to the arithmetic processing unit 20 of the navigation apparatus 1'. A smartphone 16 or the like that is equipped with a graphic user interface (GUI) and is a device capable of communicating with another device by wireless communication is detachably connected to the communication terminal connection part 14. Note that the imaging device 15 is, for example, a camera device for imaging any direction from the vehicle, and may be a rear camera for imaging optical image in the backward direction of the vehicle, or may be a 360-degree camera that images optical images in 360-degree directions of the vehicle to reconstruct an image by synthesizing the optical images as an image having a point of view looking down the vehicle from the sky. The storage device 3 includes a musical piece information storage unit 31 preliminarily storing audio data including music, video, etc.

Figure 14:
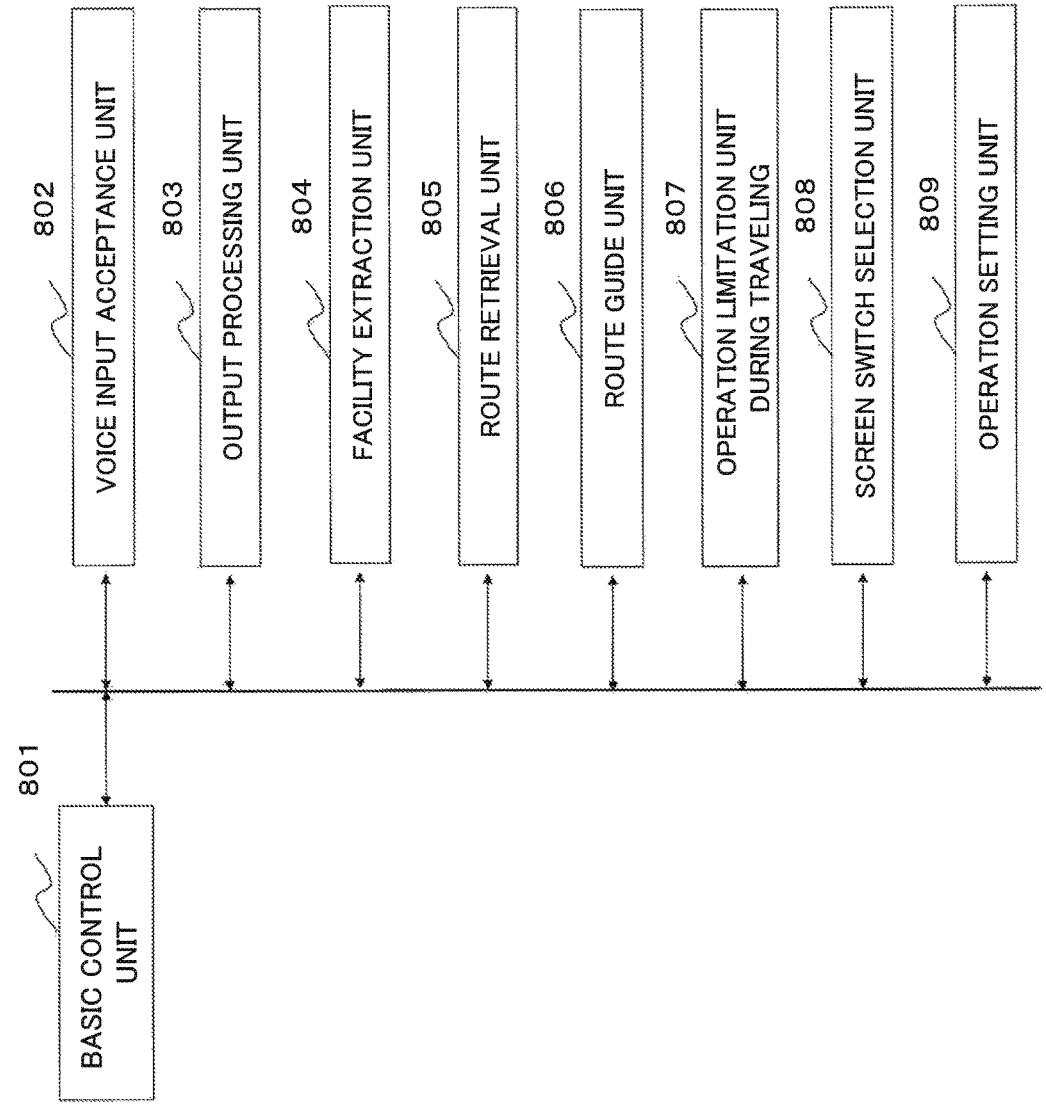
FIG. 14 is a function block diagram of an arithmetic processing unit.

FIG. 14 is a function block diagram of the arithmetic processing unit 20 of the navigation apparatus 1' according to the second embodiment. As illustrated in FIG. 14, the arithmetic processing unit 20 includes a screen switch selection unit 808 and an operation setting unit 809 in addition to the basic control unit 801, the voice input acceptance unit 802, the output processing unit 803, the facility extraction unit 804, the route retrieval unit 805, the route guide unit 806, and the operation limitation unit during traveling 807.

The screen switch selection unit 808 instructs the output processing unit 803 to perform switching to the system selected to be displayed on the screen. The operation setting unit 809 sets processing operation when an input is made to the trigger button 210.

Figure 15:
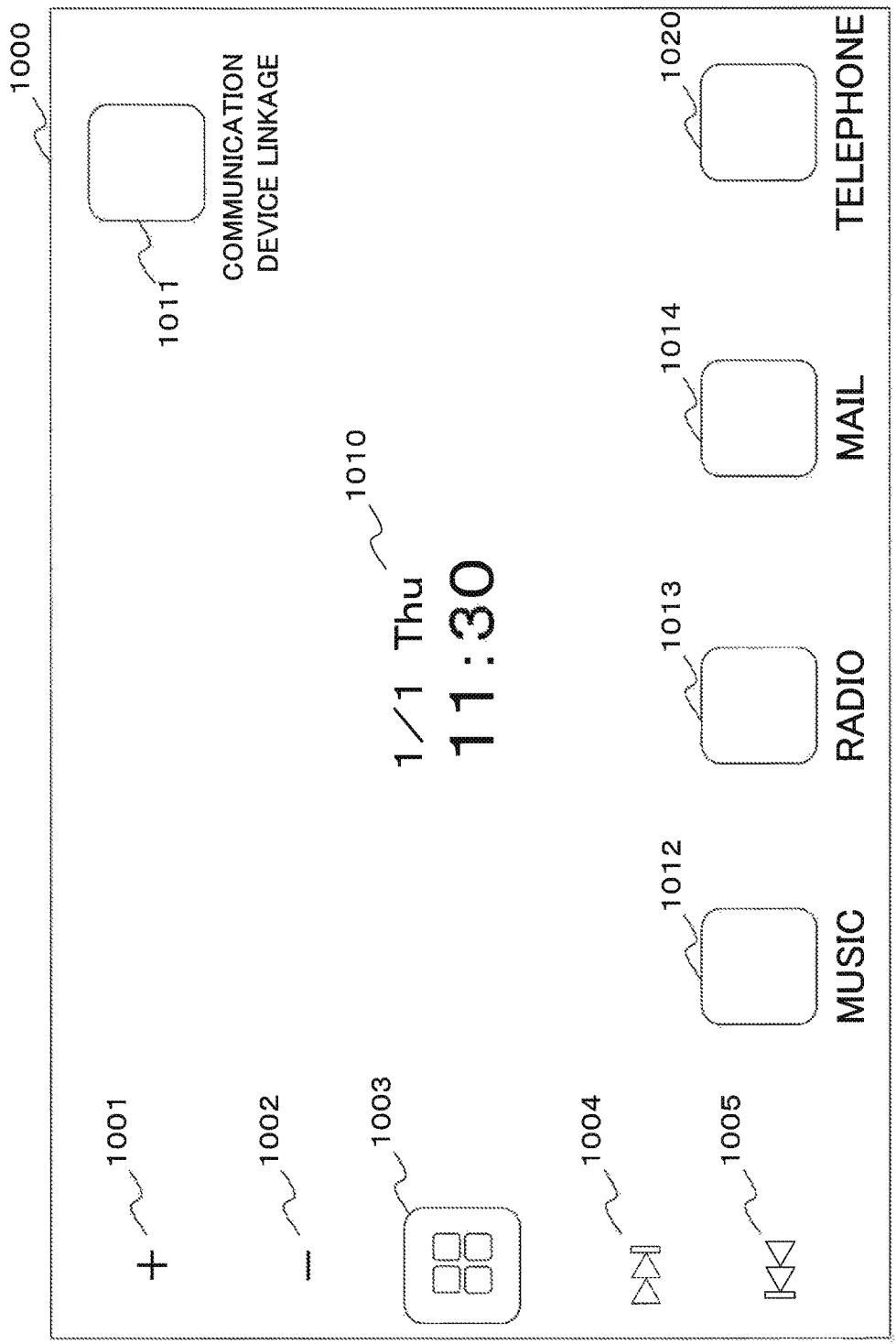
FIG. 15 is a diagram illustrating a display example of a menu screen of the navigation apparatus.

FIG. 15 is a diagram illustrating a display example of a menu screen 1000. Various control soft keys are iconized to be displayed at the left end on the menu screen 1000. The control soft keys includes, for example, a sound volume increase key 1001, a sound volume decrease key 1002, a menu display key 1003, a forward key 1004, and a backward key 1005.

Note that, upon detection of input, the menu display key 1003 makes the basic control unit 801 display the menu screen 1000. Furthermore, upon detection of input when replaying a musical piece or the like, the forward key 1004 makes the basic control unit 801 perform change operation to the next music or fast forward operation. Upon detection of input when replaying a musical piece or the like, the backward key 1005 makes the basic control unit 801 perform change operation to the previous music or fast backward operation.

The menu screen 1000 further includes a date and time display area 1010, a communication device linkage icon 1011, a music reproduction icon 1012, a radio reception start icon 1013, an E-mail menu activation icon 1014, and a telephone activation icon 1020.

Upon detection of input, the communication device linkage icon 1011 makes the screen switch selection unit 808 display an linkage GUI screen 1100 provided by the smartphone 16 via the communication terminal connection part 14.

Upon detection of input, the music reproduction icon 1012 makes the basic control unit 801 activate music reproduction function to display a music reproduction screen 1300 to be described below.

Upon detection of input, the radio reception start icon 1013 makes the basic control unit 801 activate radio broadcast reception function to display a radio broadcast reception control screen.

Upon detection of input, the E-mail menu activation icon 1014 makes the basic control unit 801 activate E-mail function to display an E-mail transmission/reception screen.

Upon detection of input, the telephone activation icon 1020 makes the basic control unit 801 activate telephone function to display a telephone control screen for controlling call request/incoming call via the smartphone 16.

Figure 16:
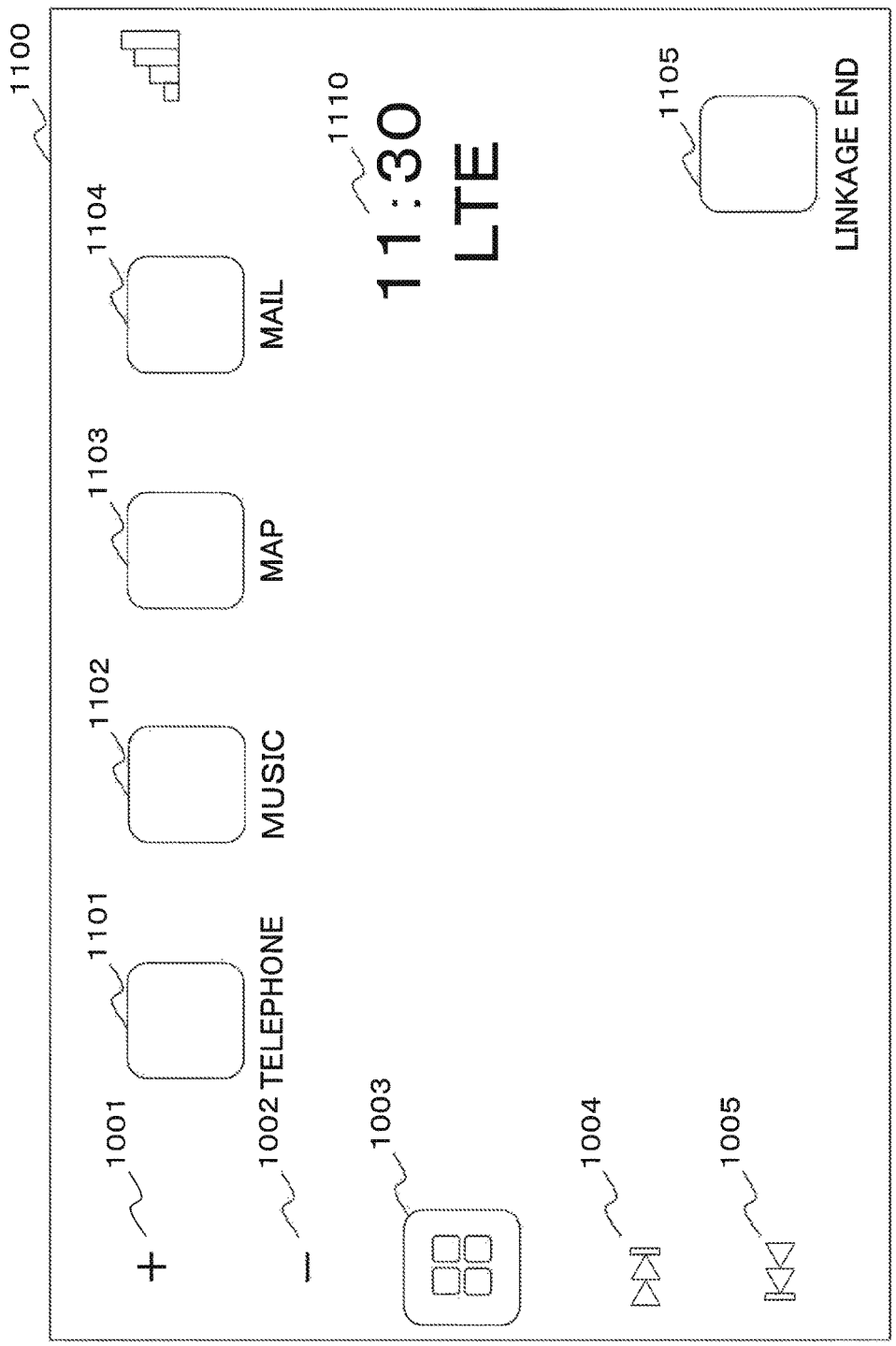
FIG. 16 is a diagram illustrating a display example of a linkage GUI screen of the navigation apparatus.

FIG. 16 is a diagram illustrating a display example of the linkage GUI screen 1100. The linkage GUI screen 1100 is displayed when the communication device linkage icon 1011 or the trigger button 210 accepts an input. The GUI screen is a GUI screen generated by the smartphone 16, but this is not limited thereto. For example, a GUI screen may be employed formed of the template screen, which is stored in the storage device 3 of the navigation apparatus 1' embedding the icon display information accepted from the smartphone 16.

In the linkage GUI screen 1100, various control soft keys are iconized to be displayed at the left end. The control soft keys include, for example, a sound volume increase key 1001, a sound volume decrease key 1002, a menu display key 1003, a forward key 1004, and a backward key 1005.

The linkage GUI screen 1100 further includes a telephone activation icon 1101, a music reproduction (MUSIC) icon 1102, a map start icon 1103, an E-mail menu activation icon 1104, a linkage end icon. 1105, and a day and Lime display area 1110.

Upon detection of input, the telephone activation icon 1101 makes the smartphone 16 activate telephone function to display a telephone control screen for controlling call request/incoming call by the smartphone 16.

Upon detection of input, the MUSIC icon 1102 makes the smartphone 16 activate music reproduction function to display a music control screen for controlling music reproduction by the smartphone 16.

Upon detection of input, the map start icon 1103 makes the smartphone 16 activate map control function to display a map control screen for controlling map usage by the smartphone 16.

Upon detection of input, the E-mail menu activation icon 1104 makes the smartphone 16 activate E-mail function to display an E-mail transmission/reception screen by the smartphone 16.

Upon detection of input, the linkage end icon 1105 makes the smartphone 16 end linkage function to return the control to the menu screen 1000 of the navigation apparatus 1'

In the day and time display area 1110, day and time information, a communication state, etc. set in the smartphone 16 are displayed.

Figure 17:
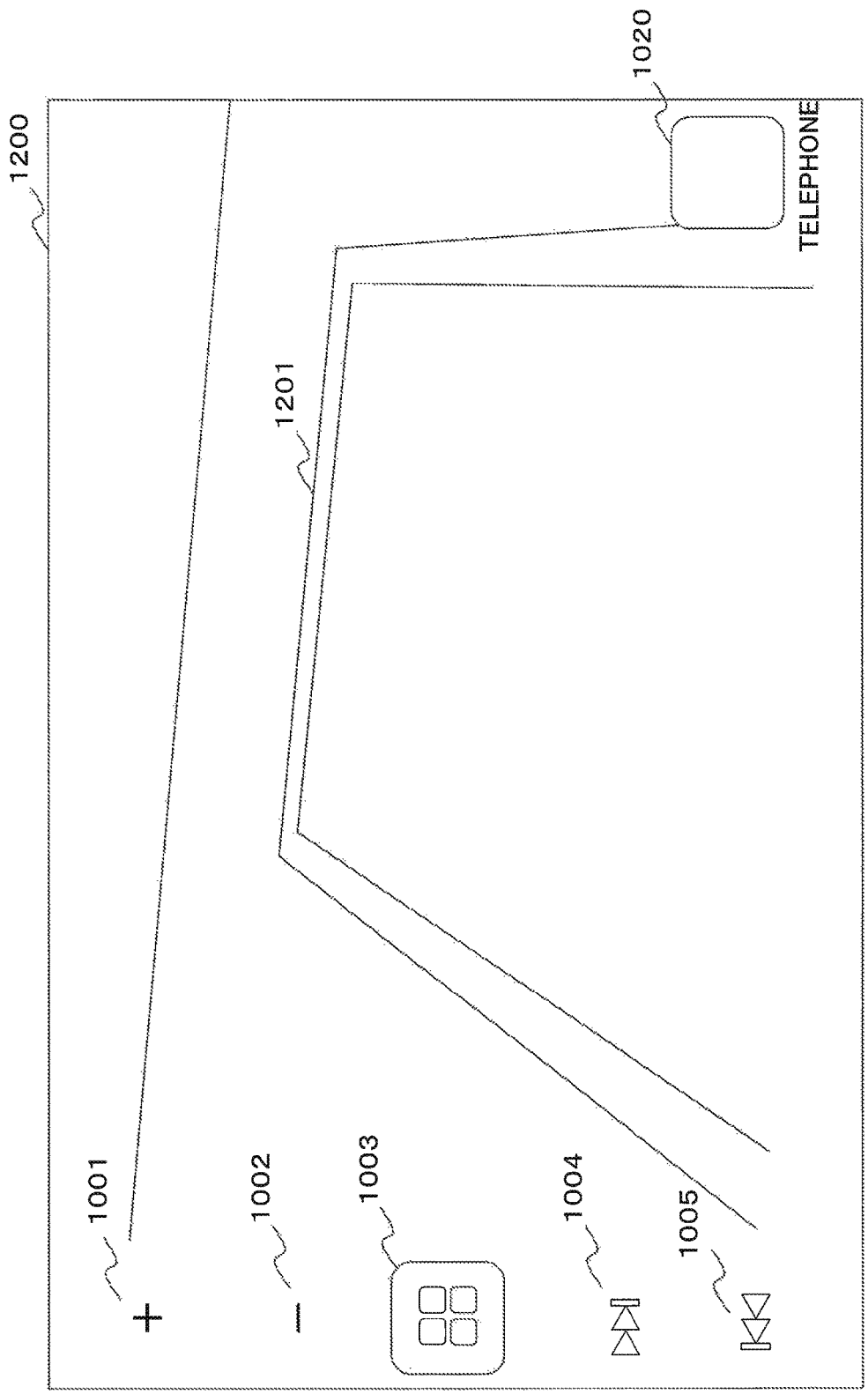
FIG. 17 is diagram illustrating a display example of a back monitor display screen of the navigation apparatus.

FIG. 17 is a diagram illustrating a display example of a back monitor display screen 1200. The back monitor display screen 1200 is displayed when the transmission of the vehicle is set to the reverse state, or when input is accepted by the trigger button 210.

The back monitor display screen 1200 includes a back view display area 1201 and a telephone activation icon 1020. The back view display area 1201 is an area where an image imaged by the imaging device 15 is displayed. Upon detection of input, the telephone activation icon 1020 makes the basic control unit 801 activate telephone function to display a telephone control screen for controlling call request/incoming call via the smartphone 16. Note that when an input to the trigger button 210 is detected while the back monitor display screen 1200 is displayed, the screen switch selection unit 808 switches the screen display to the menu screen 100.

Figure 18:
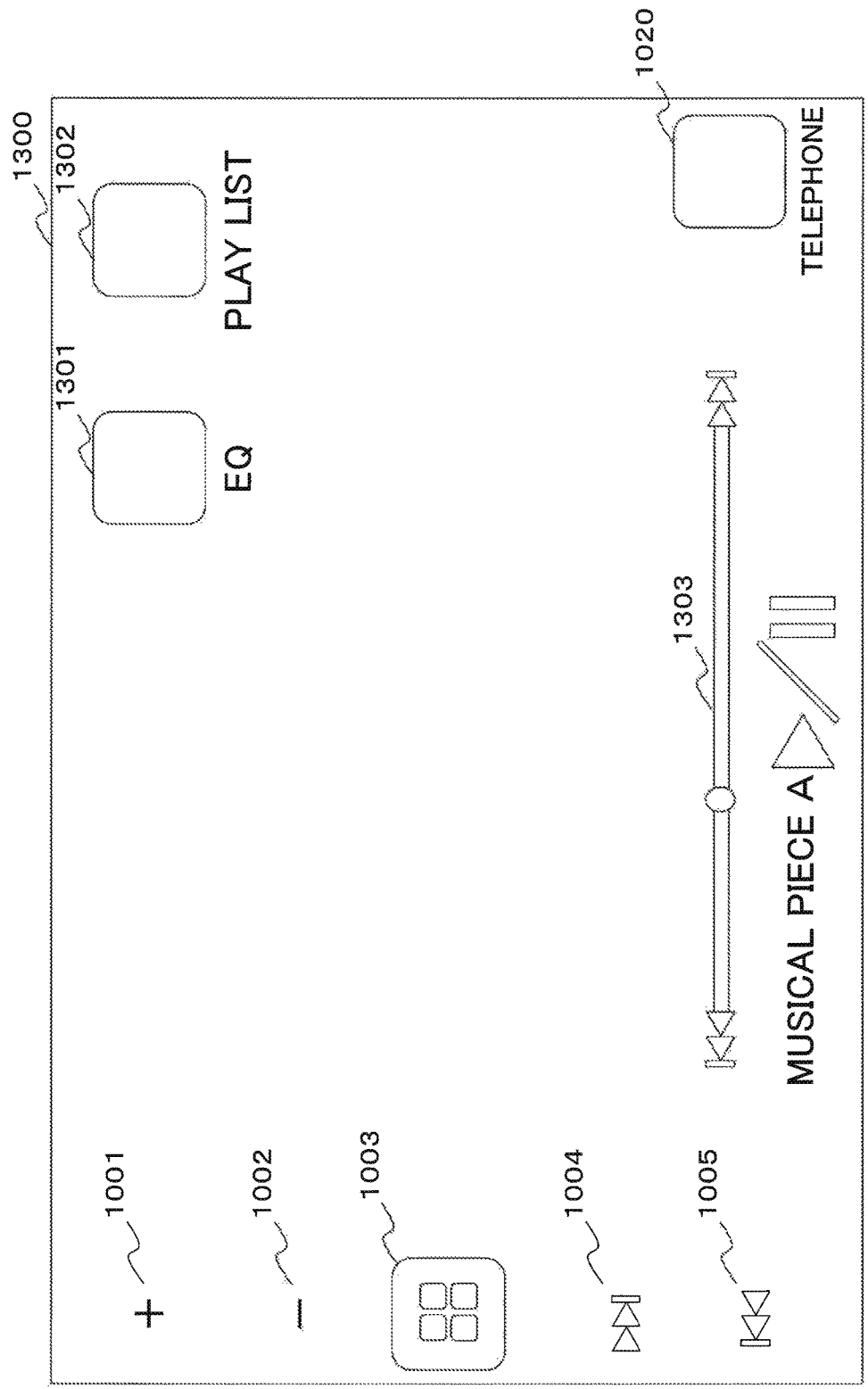
FIG. 18 is a diagram illustrating a display example of a musical piece reproduction screen of the navigation apparatus.

FIG. 18 is a diagram illustrating a display example of the musical piece reproduction screen 1300. The musical piece reproduction screen 1300 is an operation screen for accepting operations to read out information of musical piece from a musical piece information storage unit 31 included, in the storage device 3 of the navigation apparatus 1', and control reproduction state.

The musical piece reproduction screen 1300 is displayed when the music reproduction icon 1012 accepts an input on the menu screen 1000 of the navigation apparatus 1' or when the trigger button 210 accepts an input.

The musical piece reproduction screen 1300 includes an EQ icon 1301 for accepting instruction to activate an equalizer that tunes the sound of musical piece, a play list icon 1302 for preliminarily reading out order information of musical pieces to be reproduced and accepting activation of a play list for selectively controlling reproduction, a player widget 1303 for accepting instructions of reproduction, stop, fast-forward, and rewind of musical piece for control, and a telephone activation icon 1020.

Figure 19:
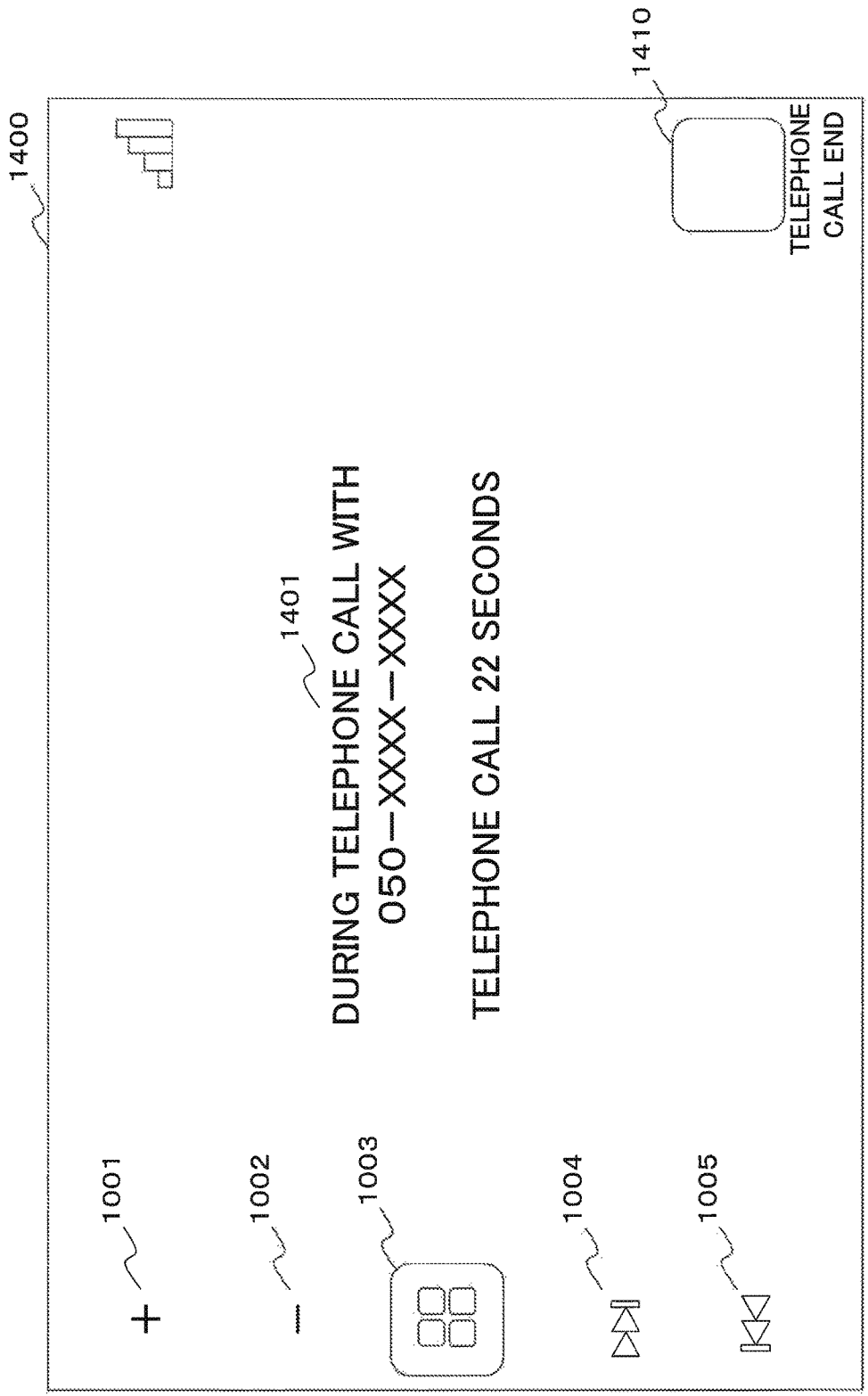
FIG. 19 is a diagram illustrating a display example of a display screen during telephone call of the navigation apparatus.

FIG. 19 is a diagram illustrating a display example of a display screen 1400 during telephone call. The display screen 1400 during telephone call is a screen that is displayed while the navigation apparatus 1' performs telephone call via the smartphone 16. For example, the display screen 1400 during telephone call is displayed when the trigger button 210 accepts an input or when the telephone activation icon 1020 accepts an input in the state where incoming call comes during displaying the menu screen 1000.

Figure 20:
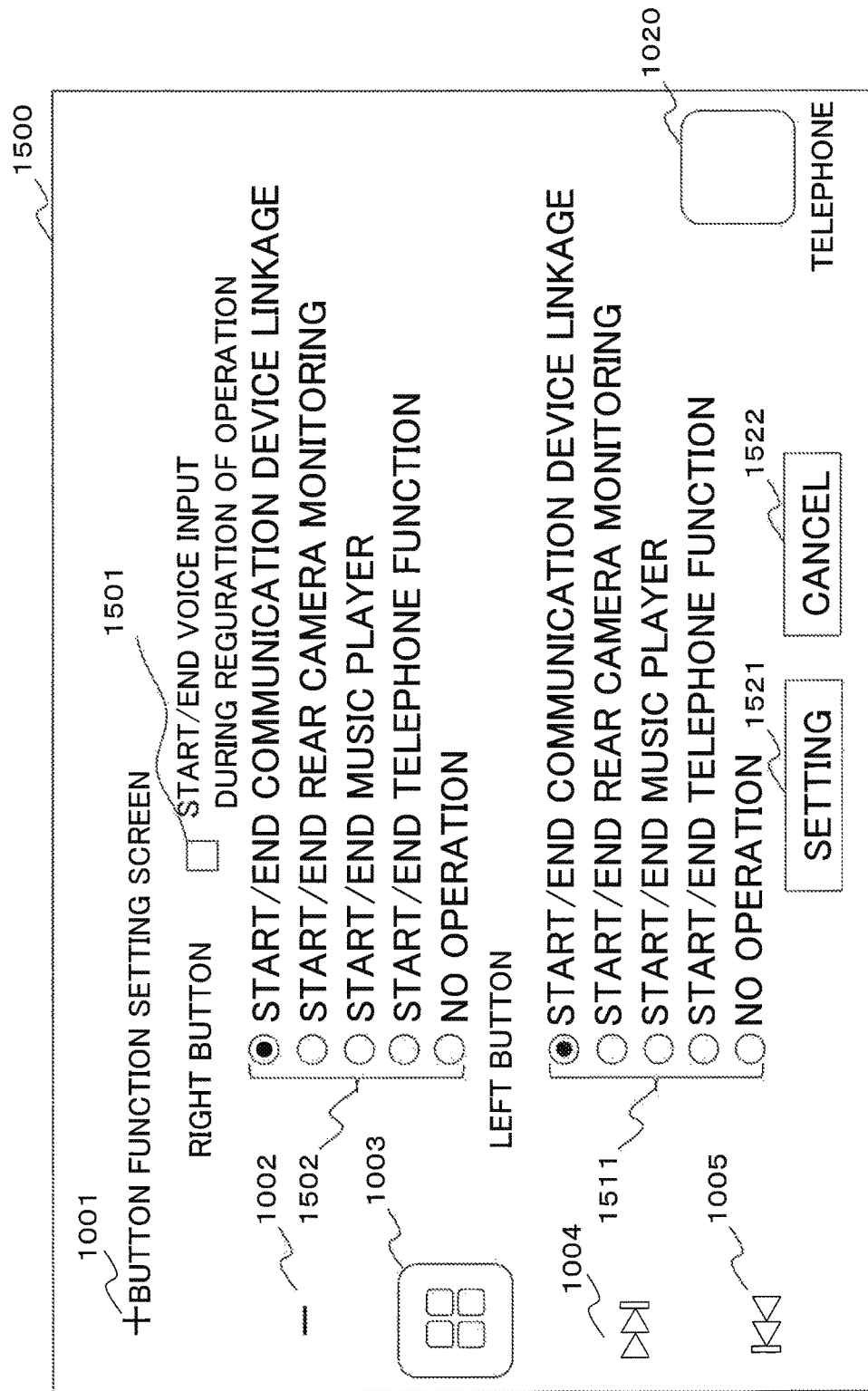
FIG. 20 is a diagram illustrating a display example of a button function setting screen of the navigation apparatus.

The display screen 1400 during telephone call includes a communication partner display area 1401 for displaying a massage indicating a telephone number or a registered name in telephone book information of the communication partner, and a telephone call end icon 1410 for making the basic control unit 801 control the smartphone 16 to end telephone call upon acceptance of input FIG. 20 is a diagram illustrating a display example of a button function setting screen 1500. The button function setting screen 1500 is a screen for accepting an input for setting operation of the navigation apparatus 1' when the trigger button 210 accepts an input.

The button function setting screen 1500 includes a right button setting input acceptance area 1502 for selectively determining operation that is performed when input is made to the button on the side of the driving seat (right button) of the trigger buttons 210, a check box 1501 for accepting the setting of whether a control for starting voice input is performed instead of activating the operation of the function of the navigation apparatus 1' that is regulated during driving and is related to the right button, and a left button setting input acceptance area 1511 for selectively determining operation that is performed when input is made to the button on the side of the passenger seat (left button) of the trigger buttons 210. The button function setting screen 1500 also includes a setting button 1521 for accepting the instruction to reflect, in the setting, the information input to the right button setting input acceptance area 1502, the check box 1501, and the left button setting input acceptance area 1511, and a cancel button 1522 for accepting the instruction to return the display to the menu screen 1000 without reflecting, in the setting, the information input to the right button setting input acceptance area 1502, the check box 1501, and the left button setting input acceptance area 1511.

As for the setting items by the right button setting input acceptance area 1502, switching the starts end of the communication device linkage, switching the start/end of the monitoring by the rear camera, switching the start end of the music player function, switching the start/end of the telephone function, which are described above, or starting no processing, that is, invalidation can be selectively set in this regard, even when input is made to the right button 1502, when operation is regulated, that is, when the vehicle is traveling, all of the start/end functions are cancelled, and voice input acceptance is started by the basic control unit 801 as an alternative function when the check of the check box 1501 is in "ON" state.

The setting items of the left button setting input acceptance area 1511 can be also selectively set similar to the right button setting input acceptance area 1502. In this regard, the left button setting input acceptance area 1511 is assumed to be operated by the passenger on the passenger seat, so that the above regulation of operation is not performed, and control of start/end of the functions is performed depending on the setting.

When the setting button 1521 accepts an input, the operation setting unit 809 reads out input states of the right button setting input acceptance area 1502, the left button setting input acceptance area 1511, and the check box 1501, and stores the input states in a predetermined area of the storage devices 3 in association with the screen switch selection unit 808.

When the trigger button 210 receives an input, the screen switch selection unit 808 reads out the operation associated in this manner, and controls the start/end of the associated operation, and switches the screen.

As described above, the embodiments of the invention are described by describing the embodiments. However, the invention is not limited to the embodiments. The characteristic processing described in the above embodiments can be also applied to other equipment (for example, not the navigation apparatus 1, but a vehicle display apparatus, a vehicle control apparatus, a vehicle audiovisual apparatus, a vehicle video projection apparatus, and a mobile terminal such as a smartphone, a tablet, or a personal computer;

REFERENCE SIGNS LIST 1 navigation apparatus
10D driver
20 arithmetic processing unit
100 display unit
160 protrusion unit
210 trigger button
801 basic control unit
802 voice input acceptance unit
803 output processing unit
804 facility extraction unit
805 route retrieval unit
806 route guide unit
807 operation limitation unit during traveling

The invention claimed is:

1. Vehicle equipment comprising a protrusion unit provided near at least one side among four sides forming an outer rim of a rectangular display having a touch panel, the protrusion unit being provided such that a long side of the protrusion unit is substantially in parallel with the one side,
wherein a button is provided at at least one of both ends of the protrusion unit in an extending direction of the long side, the button being capable of accepting an input in the extending direction of the long side of the protrusion unit,
wherein upon acceptance of an input, the button outputs an instruction for starting a sound collection for voice recognition, and
wherein the vehicle component further comprises a control unit for starting a sound collection for voice recognition, wherein
when the button provided at the end nearer to the driving seat accepts an input while a moving body to which the vehicle equipment is attached is moving, the control unit starts the sound collection for voice recognition and limits a screen input operation.

2. The vehicle equipment according to claim 1, wherein the button is provided so as to be offset by a predetermined distance from another side among the four sides, the another side being in contact with the one side at a right angle.

3. The vehicle equipment according to claim 1, wherein one of buttons outputs an instruction to tilt the rectangular display, the one of the buttons being provided at one of the both ends of the protrusion unit in the extending direction of the long side, the one of the both ends being a far end from the driving seat of the vehicle mounting thereon the vehicle equipment.

4. The vehicle equipment according to claim 1, wherein the protrusion unit is provided at a portion on a display screen of the rectangular display, the portion being excluded from an area that detects a touch to the touch panel.

* * * * *